United States Patent
Kim et al.

(10) Patent No.: US 12,511,207 B2
(45) Date of Patent: Dec. 30, 2025

(54) STORAGE DEVICE AND METHOD OF TESTING STORAGE DEVICE

(71) Applicant: SAMSUNG ELECTRONICS CO., LTD., Suwon-si (KR)

(72) Inventors: Wonchol Kim, Suwon-si (KR); Jaegyu Choi, Suwon-si (KR); Tae-Yong Kim, Suwon-si (KR); Jiwon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/783,897

(22) Filed: Jul. 25, 2024

(65) Prior Publication Data

US 2025/0231846 A1    Jul. 17, 2025

(30) Foreign Application Priority Data

Jan. 12, 2024    (KR) .................. 10-2024-0005226

(51) Int. Cl.
| | | |
|---|---|---|
| G06F 11/00 | (2006.01) | |
| G06F 11/22 | (2006.01) | |
| G06F 11/273 | (2006.01) | |
| G11C 29/00 | (2006.01) | |

(52) U.S. Cl.
CPC ...... *G06F 11/2273* (2013.01); *G06F 11/2294* (2013.01); *G06F 11/2733* (2013.01); *G11C 29/00* (2013.01)

(58) Field of Classification Search
None
See application file for complete search history.

(56) References Cited

U.S. PATENT DOCUMENTS

| | | | |
|---|---|---|---|
| 8,495,574 B2 | 7/2013 | Harding et al. | |
| 8,776,025 B2 | 7/2014 | Wisniewski | |
| 10,324,831 B1 | 6/2019 | Zhang et al. | |
| 10,331,513 B2 | 6/2019 | Wenn | |
| 10,496,524 B2 | 12/2019 | Clark et al. | |
| 10,613,969 B2 | 4/2020 | Zacks et al. | |
| 11,520,682 B2 | 12/2022 | Saha et al. | |
| 2016/0092328 A1* | 3/2016 | Yeom ................. | G06F 13/4282 714/33 |
| 2017/0132121 A1 | 5/2017 | Cooper et al. | |

(Continued)

FOREIGN PATENT DOCUMENTS

| | | |
|---|---|---|
| KR | 10-0353448 B1 | 1/2003 |
| KR | 10-2024-0145143 | 10/2024 |

OTHER PUBLICATIONS

Compute Express Link (CXL) Specification 2.0 (Year: 2020).*

*Primary Examiner* — Bryce P Bonzo
*Assistant Examiner* — Gabriella Kanani Shelton
(74) *Attorney, Agent, or Firm* — Morgan, Lewis & Bockius LLP

(57) ABSTRACT

A storage device including: a nonvolatile memory; and a controller configured to control the nonvolatile memory, wherein the controller is configured to: obtain authority to access an external memory, wherein the external memory is allocated by an external host device; receive a test scenario, which includes a plurality of commands, from the external host device; read a first test code corresponding to a first test check point from the external memory when the first test check point arrives while the test scenario is executed; and execute the first test code.

20 Claims, 18 Drawing Sheets

(56) References Cited

U.S. PATENT DOCUMENTS

| | | | |
|---|---|---|---|
| 2022/0121542 A1* | 4/2022 | Khare | G06F 11/2268 |
| 2022/0283223 A1* | 9/2022 | Onuma | G01R 31/3177 |
| 2023/0222054 A1 | 7/2023 | Fan et al. | |
| 2024/0095138 A1* | 3/2024 | Malisic | G06F 11/27 |
| 2024/0320088 A1* | 9/2024 | Park | G06F 11/1016 |
| 2024/0330158 A1 | 10/2024 | Kim et al. | |
| 2025/0173302 A1* | 5/2025 | Spica | G06F 13/4221 |

* cited by examiner

STORAGE DEVICE AND METHOD OF TESTING STORAGE DEVICE

CROSS-REFERENCE TO RELATED APPLICATION

This application claims priority under 35 U.S.C. § 119 to Korean Patent Application No. 10-2024-0005226 filed on Jan. 12, 2024, in the Korean Intellectual Property Office, the disclosure of which is incorporated by reference herein in its entirety.

TECHNICAL FIELD

Embodiments of the present disclosure relate to a semiconductor device, and more particularly, to a storage device that provides improved test convenience and a method of testing the storage device.

DISCUSSION OF RELATED ART

After a storage device is manufactured, it is tested to ensure its functionality. For example, testing is necessary to differentiate between faulty and normal storage devices.

One method of testing a storage device involves combining and executing various functions on the storage device in different ways. As the complexity of a test scenario increases, the coverage and thoroughness of the functions tested on the storage device may also improve.

Testing the storage device may require using its own resources. However, the resource available on the storage device are typically allocated to perform original functions. Accordingly, the resources available for testing purposes may be limited.

SUMMARY

Embodiments of the present disclosure provide a storage device that has improved test convenience without being limited by the device's resources, and a method of testing the storage device.

According to an embodiment of the present disclosure, there is provided a storage device including: a nonvolatile memory; and a controller configured to control the nonvolatile memory, wherein the controller is configured to: obtain authority to access an external memory, wherein the external memory is allocated by an external host device; receive a test scenario, which includes a plurality of commands, from the external host device; read a first test code corresponding to a first test check point from the external memory when the first test check point arrives while the test scenario is executed; and execute the first test code.

According to an embodiment of the present disclosure, there is provided a method of testing a storage device, the method including: loading test data into a first area of a host memory; storing first location information of the test data in a second area of the host memory; allocating access authority to the storage device for the first area; transmitting a test scenario, which includes a plurality of commands, to the storage device; receiving a signal indicating test completion from the storage device; and reading a test result from the first area.

According to an embodiment of the present disclosure, there is provided a method of testing a storage device, the method including: loading data for testing the storage device to a compute express link (CXL) memory; storing first location information of the data loaded to the CXL memory in a host memory; allocating, to the storage device, authority to access the CXL memory; transmitting a test scenario, which includes a plurality of commands, to the storage device; receiving, from the storage device, a signal indicating completion of a test; and reading a test result from the CXL memory.

BRIEF DESCRIPTION OF THE DRAWINGS

The above and other features of the present disclosure will become apparent by describing in detail embodiments thereof with reference to the accompanying drawings.

DETAILED DESCRIPTION OF THE EMBODIMENTS

Below, embodiments of the present disclosure will be described in detail and clearly to such an extent that one of ordinary skill in the art can carry out the present disclosure.

Figure 1:
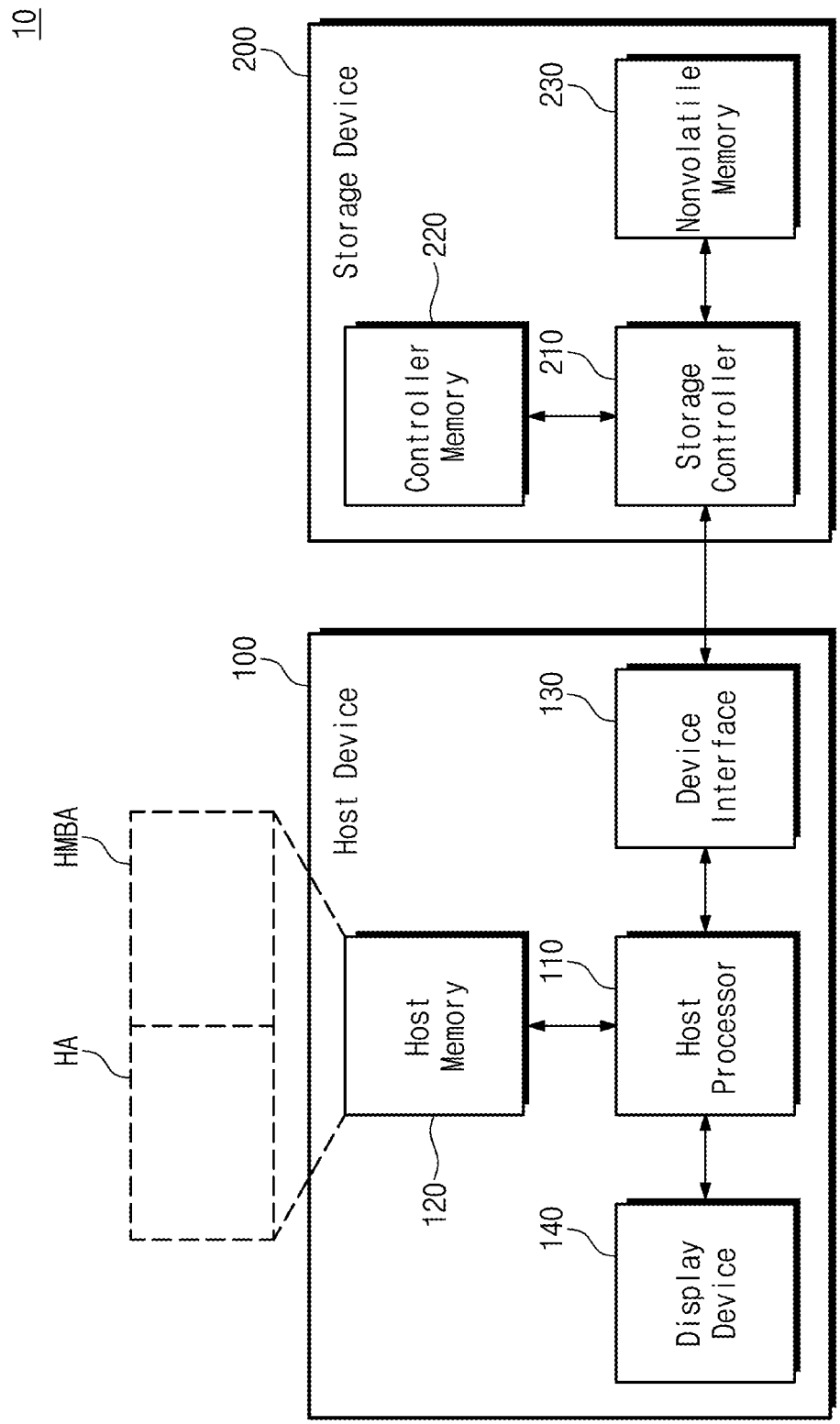
FIG. 1 illustrates a test system according to a first embodiment of the present disclosure.

FIG. 1 illustrates a test system 10 according to a first embodiment of the present disclosure. Referring to FIG. 1, the test system 10 may include a host device 100 and a storage device 200. The host device 100 may test the storage device 200. For example, the host device 100 may test the storage device 200 by enabling the storage device 200 to execute various functions sequentially or in combination.

The host device 100 may include a host processor 110, a host memory 120, a device interface 130, and a display device 140.

The host processor 110 may execute an operating system and various applications of the host device 100. Depending on a request of the operating system or applications, the host processor 110 may control components of the host device 100 and communicate with the storage device 200. For example, the host processor 110 may include a central processing unit (CPU). The host processor 110 may include a plurality of cores or hardware accelerators that can operate independently collaboratively.

The host memory 120 may be a main memory of the host device 100. The host memory 120 may be accessed by the host processor 110. For example, the host memory 120 may include a random access memory such as a dynamic random access memory (DRAM), a static RAM (SRAM), a phase-change RAM (PRAM), a magnetic RAM (MRAM), a ferroelectric RAM (FRAM), or a resistive RAM (RRAM).

The host memory 120 may include two or more memory modules where two or more memory packages are mounted. For example, the host memory 120 may communicate with the host processor 110 using the dual in-line memory module (DIMM) standard.

In an embodiment, the host processor 110 may use the entire storage space of the host memory 120. As another example, the host processor 110 may use a first portion of the storage space of the host memory 120 and may allow the storage device 200 to use a second portion of the storage space of the host memory 120.

In the storage space of the host memory 120, a storage space which is used by the host processor 110 may be a host area HA. In the storage space of the host memory 120, a storage space which is allocated to be used by the storage device 200 may be a host memory buffer area HMBA. In an embodiment, the host memory buffer area HMBA may be exclusively used by the storage device 200.

The device interface 130 may provide an interface for communicating with an external device. For example, the device interface 130 may be configured to communicate with the storage device 200 using the non-volatile memory express (NVMe) or the peripheral component interconnect express (PCIe) standards.

The display device 140 may display information stored in the host memory 120 to the user. For example, the display device 140 may be implemented in various forms, for example, the display device 140 may be implemented as a light emitting diode (LED) display device or a liquid crystal display (LCD) device.

The storage device 200 may perform various operations, such as a write operation, a read operation, and an erase operation, depending on a request of the host device 100. The storage device 200 may perform various background operations for managing itself without a request from the host device 100. In an embodiment, the storage device 200 may be tested by the host device 100.

The storage device 200 may include a storage controller 210, a controller memory 220, and a nonvolatile memory 230. Each of the storage controller 210 and the controller memory 220 may be implemented in hardware as a circuit.

The storage controller 210 may access the controller memory 220 and the nonvolatile memory 230. The storage controller 210 may include two or more processing cores for executing firmware to manage the storage device 200, performing various operations based on requests from the host device 100, and carrying out various background operations.

The storage controller 210 may perform tests on the storage device 200 based on requests from the host device 100. For example, the storage controller 210 may test the storage device 200 by accessing the controller memory 220, accessing the nonvolatile memory 230, and performing various internal functions.

In an embodiment, the storage controller 210 may include an internal memory configured to load codes of the firmware and metadata to manage the storage device 200. For example, the internal memory may include an SRAM or a DRAM.

The controller memory 220 may be used as a buffer memory or cache memory which stores various data communicated with the host device 100. The controller memory 220 may be used to store mapping data (e.g., a mapping table) that indicates the mapping relationship between logical addresses allocated by the host device 100 to the storage device 200 and the physical addresses of the nonvolatile memory 230.

For example, the controller memory 220 may be implemented with a random access memory such as a DRAM, a PRAM, a DRAM, an FRAM, or an RRAM. In an embodiment, the controller memory 220 may be integrated with an internal memory of the storage controller 210. When the controller memory 220 is not included in the storage device 200, the functions of the controller memory 220 may be performed by using the internal memory of the storage controller 210.

The nonvolatile memory 230 may include various nonvolatile memories such as a flash memory, a phase-change memory, a magnetic memory, a ferroelectric memory, and a resistive memory. A first portion of the storage space of the nonvolatile memory 230 may be used to store data of the host device 100. A second portion of the storage space of the nonvolatile memory 230 may be used as a reserved area to store the mapping data and the metadata for managing the storage device 200, or it may be used as an over-provisioning area to enhance the performance of the storage device 200.

Figure 2:
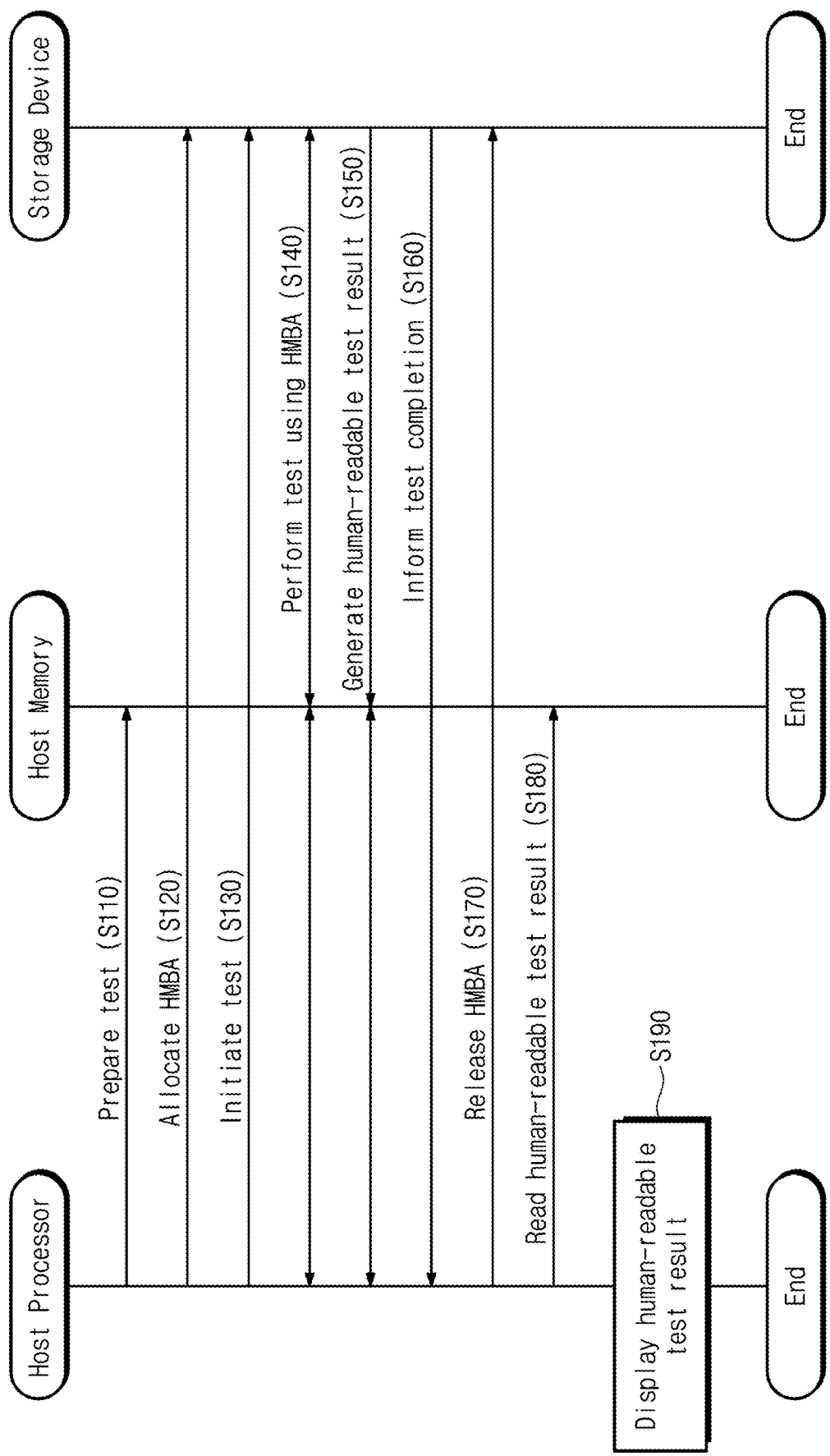
FIG. 2 illustrates a method of testing a storage device, according to a first embodiment of the present disclosure.

FIG. 2 illustrates a method of testing the storage device 200 according to the first embodiment of the present disclosure. Referring to FIGS. 1 and 2, in operation S110, the host processor 110 may prepare a test in the host memory 120. For example, when the host memory buffer area HMBA is not allocated to the host memory 120, the host processor 110 may load various data or codes necessary for testing the storage device 200 into the host memory 120.

In operation S120, the host processor 110 may allocate the host memory buffer area HMBA to the host memory 120. For example, the host processor 110 may allocate a portion of the storage space within the host memory 120, where the data or codes are loaded in operation S110, to the host memory buffer area HMBA. In an embodiment, the host processor 110 may transmit address information about the storage space of the host memory buffer area HMBA, where the data or codes are loaded, to the storage device 200 either together or separately.

In operation S130, the host processor 110 may initiate the test of the storage device 200. For example, the host processor 110 may initiate the test of the storage device 200 by transmitting a test scenario to the storage device 200. For example, the test scenario may include various commands for executing various functions of the storage device 200 independently, sequentially, or in combination.

In operation S140, the storage device 200 may perform the test by using the host memory buffer area HMBA of the host memory 120. For example, the storage controller 210 may send requests to the host processor 110 to access the host memory buffer area HMBA of the host memory 120. The host processor 110, based on these requests from the storage controller 210, may access the host memory buffer area HMBA and transfer the access results back to the storage controller 210. That is, the host processor 110 may arbitrate (e.g., manage and control) the access of the storage controller 210 to the host memory buffer area HMBA of the host memory 120.

In an embodiment, the storage controller 210 may test the storage device 200 by using the data or codes loaded to the host memory buffer area HMBA of the host memory 120. The storage controller 210 may record the results of the test, for example, information about the test coverage, in the host memory buffer area HMBA of the host memory 120. For example, the storage controller 210 may record the information about the test coverage in the form of a bitmap.

In operation S150, the storage device 200 may generate a human-readable test result by using the host memory buffer area HMBA of the host memory 120. For example, the storage controller's 210 access to the host memory buffer area HMBA of the host memory 120 may be managed and controlled by the host processor 110.

For example, the storage controller 210 may convert the bitmap, which includes the information about the test coverage, into a human-readable test result using the data or codes loaded to the host memory buffer area HMBA of the host memory 120. The human-readable test result may present the test coverage information as character strings or images that can be easily understood by humans. The storage controller 210 may write the human-readable test result in the host memory buffer area HMBA of the host memory 120.

In operation S160, the storage device 200 may notify the host processor 110 that the test is completed. For example, after the storage controller 210 generates the human-readable test result and writes it in the host memory buffer area HMBA of the host memory 120, the storage controller 210 may send a signal to the host processor 110 to notify that the test is completed.

In operation S170, the host processor 110 may release the host memory buffer area HMBA of the host memory 120. The host processor 110 may release the exclusive access of the storage controller 210 to the host memory buffer area HMBA of the host memory 120 by releasing the host memory buffer area HMBA of the host memory 120. In other words, the host processor 110 may terminate the exclusive access of the storage controller 210 to the host memory buffer area HMBA of the host memory 120 by releasing the host memory buffer area HMBA.

In operation S180, the host processor 110 may read the human-readable test result from the host memory 120. In operation S190, the host processor 110 may display the human-readable test result. For example, the host processor 110 may display the human-readable test result by using the display device 140.

As described above, according to an embodiment of the present disclosure, the storage device 200 is tested using the host memory buffer area HMBA of the host memory 120, rather than the controller memory 220 of the storage device 200 or the internal memory of the storage controller 210. The approach prevents the test of the storage device 200 from being restricted or delayed due to limitations on the storage device's 200 resources, thereby improving the convenience of testing the storage device 200.

Additionally, while the storage device 200 is being tested, the host processor 110 may only arbitrate the access of the storage controller 210 to the host memory buffer area HMBA of the host memory 120, without directly participating in the test. Accordingly, the host processor 110 can perform other tasks while the storage device 200 is being tested.

In an embodiment, the test of the storage device 200 may be performed deterministically, with the storage device 200 completing the test during a preset time. In this case, operation S160 may be omitted, and the host processor 110 may perform operation S170 after the preset time has elapsed from the start of the test in operation S130.

Figure 3:
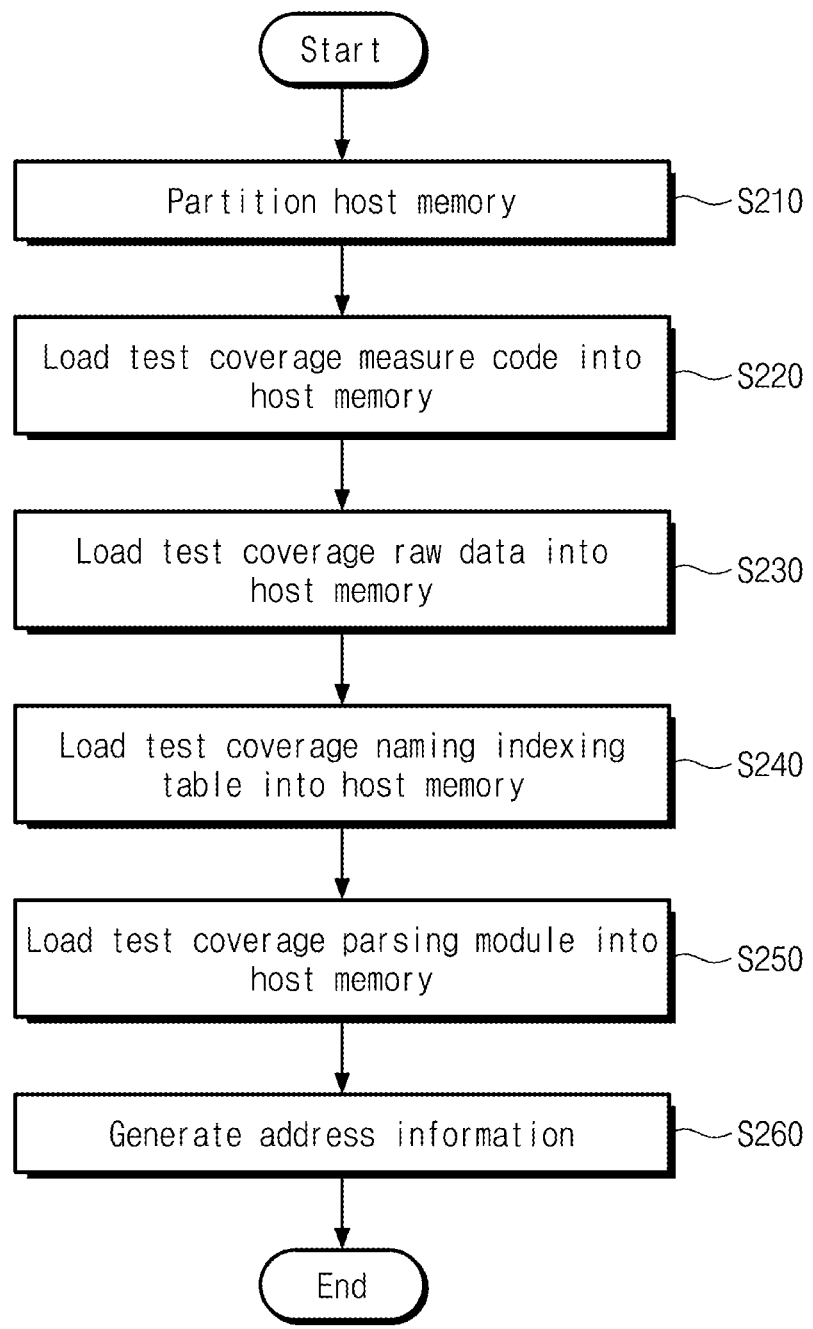
FIG. 3 is a diagram illustrating an example of a method in which a host processor prepares a test.

FIG. 3 illustrates an example of a method (operation S110 of FIG. 2) in which the host processor 110 prepares the test. Referring to FIGS. 1 and 3, in operation S210, the host processor 110 may partition the host memory 120. For example, the host processor 110 may partition the storage space of the host memory 120 into two or more regions. In an embodiment, the host processor 110 may partition the storage space of the host memory 120 into a region to be used as the host area HA and a region to which data or codes for testing the storage device 200 are to be loaded.

In operation S220, the host processor 110 may load a test coverage measure code into the host memory 120. The test coverage measure code may include test codes which are executable to test the storage device 200.

In operation S230, the host processor 110 may load test coverage raw data into the host memory 120. The test coverage raw data may be a bitmap which includes bits corresponding to individual functions of the storage device 200 targeted for testing, or to combinations of these functions. Alternatively, the test coverage raw data may be a bitmap which includes bits corresponding to the test codes of the test coverage measure code.

In operation S240, the host processor 110 may load a test coverage naming indexing table into the host memory 120. The test coverage naming indexing table may be data that indexes each bit of the test coverage raw data to the corresponding test.

In operation S250, the host processor 110 may load a test coverage parsing module into the host memory 120. The test coverage parsing module may include codes which convert the bitmap of the test coverage raw data into the human-readable test result by using the test coverage naming indexing table.

In operation S260, the host processor 110 may generate address information. For example, the host processor 110 may generate address information about an address of the host memory 120, where each of the test coverage measure code, the test coverage raw data, the test coverage naming indexing table, and the test coverage parsing module is loaded. The host processor 110 may store the generated address information in the host memory 120. In an embodiment, the address information which the host processor 110 generates may be the address information transferred to the storage device 200, as described with reference to operation S120 of FIG. 2.

Figure 4:
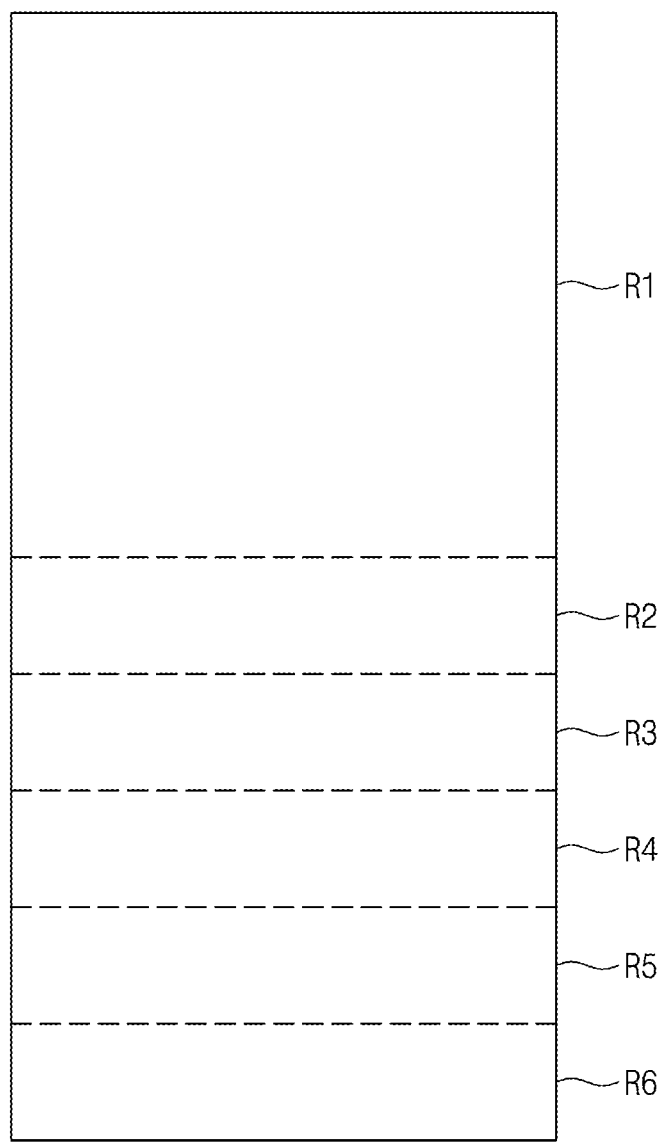
FIGS. 4, 5, and 6 illustrate an example in which a storage space of a host memory is accessed when a host processor performs the method of FIG. 3.
Figure 5:
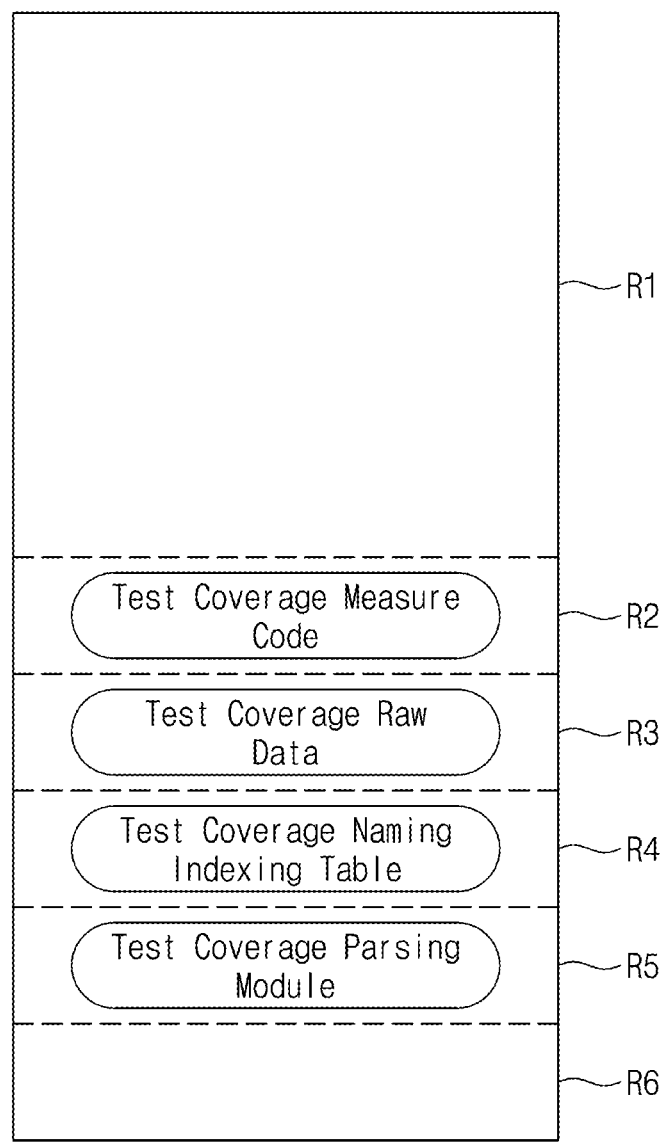
Figure 6:
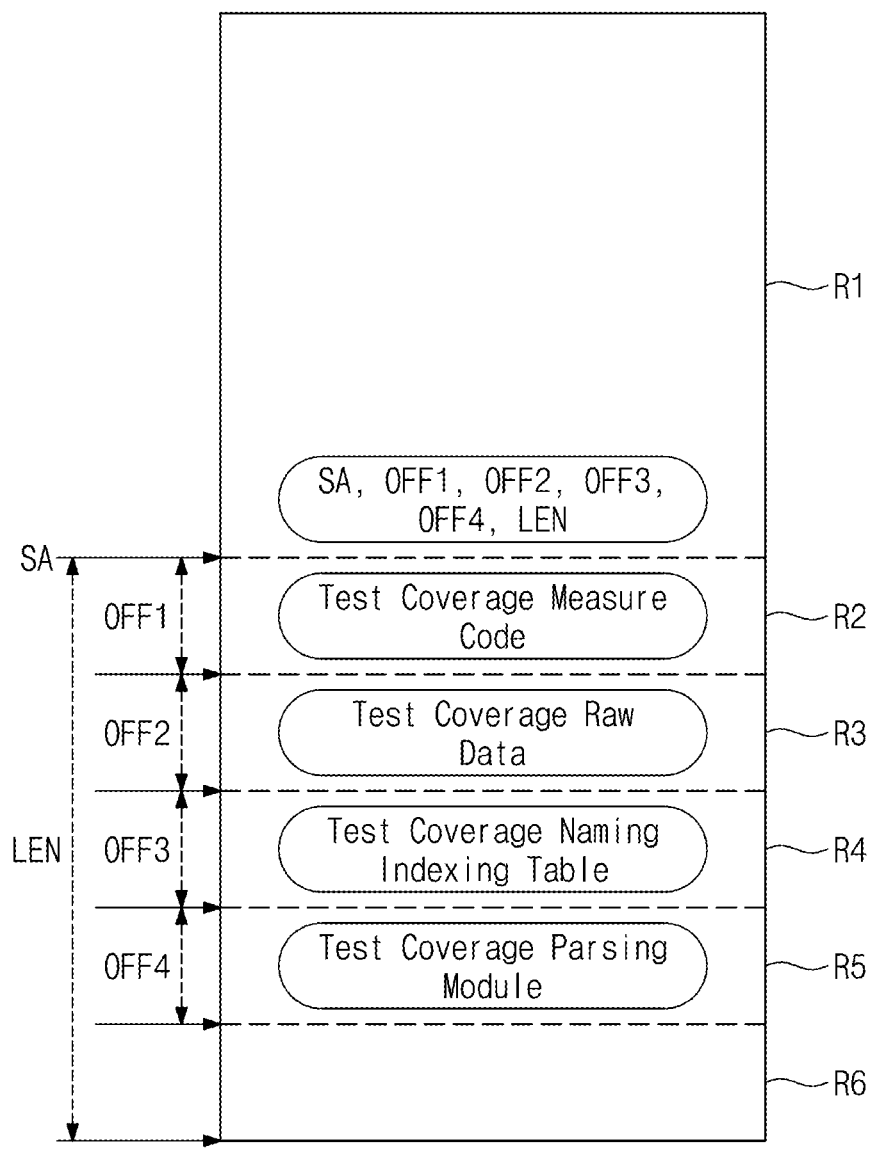

FIGS. 4, 5, and 6 illustrate an example in which the storage space of the host memory 120 is accessed when the host processor 110 performs the method of FIG. 3. Referring to FIGS. 1, 3, and 4, as described in operation S210, the host processor 110 may partition the storage space of the host memory 120. For example, the host processor 110 may partition the storage space of the host memory 120 into a first region R1, a second region R2, a third region R3, a fourth region R4, a fifth region R5, and a sixth region R6.

In an embodiment, the host memory 120 may allocate the second region R2, the third region R3, the fourth region R4, and the fifth region R5 to have capacities identical to or larger than the capacities of the test coverage measure code, the test coverage raw data, the test coverage naming indexing table, and the test coverage parsing module. The host memory 120 may allocate the sixth region R6 to have a capacity identical to or larger than the capacity of the human-readable test result. In an embodiment, the second region R2, the third region R3, the fourth region R4, the fifth region R5, and the sixth region R6 may have the same capacity or different capacities.

In an embodiment, the host processor 110 may allocate the second region R2, the third region R3, the fourth region R4, the fifth region R5, and the sixth region R6 to have sequential addresses.

Referring to FIGS. 1, 3, and 5, as described with reference to operation S220, operation S230, operation S240, and operation S250, the host processor 110 may load the test coverage measure code to the second region R2, the test coverage raw data to the third region Re, the test coverage naming indexing table to the fourth region R4, and the test coverage parsing module to the fifth region R5.

Referring to FIGS. 1, 3, and 6, the host processor 110 may generate address information. For example, the host processor 110 may generate a start address SA of the second region R2 as a portion of the address information. The start address SA of the second region R2 may be the start address SA of the entire area including the second region R2, the third region R3, the fourth region R4, the fifth region R5, and the sixth region R6.

The host processor 110 may generate a difference between the start address SA of the second region R2 and a start address of the third region R3 as a first offset OFF1, which is a portion of the address information. The host processor 110 may generate a difference between the start address of the third region R3 and a start address of the fourth region R4 as a second offset OFF2, which is a portion of the address information.

The host processor 110 may generate a difference between the start address of the fourth region R4 and a start address of the fifth region R5 as a third offset OFF3, which is a portion of the address information. The host processor 110 may generate a difference between the start address of the fifth region R5 and a start address of the sixth region R6 as a fourth offset OFF4, which is a portion of the address information.

The host processor 110 may generate a difference between the start address SA of the second region R2 and an end address of the sixth region R6 as length information LEN, which is a portion of the address information. The length information LEN may be an address length of the entire area including the second region R2, the third region R3, the fourth region R4, the fifth region R5, and the sixth region R6.

The host processor 110 may store the address information including the start address SA, the first offset OFF1, the second offset OFF2, the third offset OFF3, the fourth offset OFF4, and the length information LEN in the first region R1 of the host memory 120.

Figure 7:
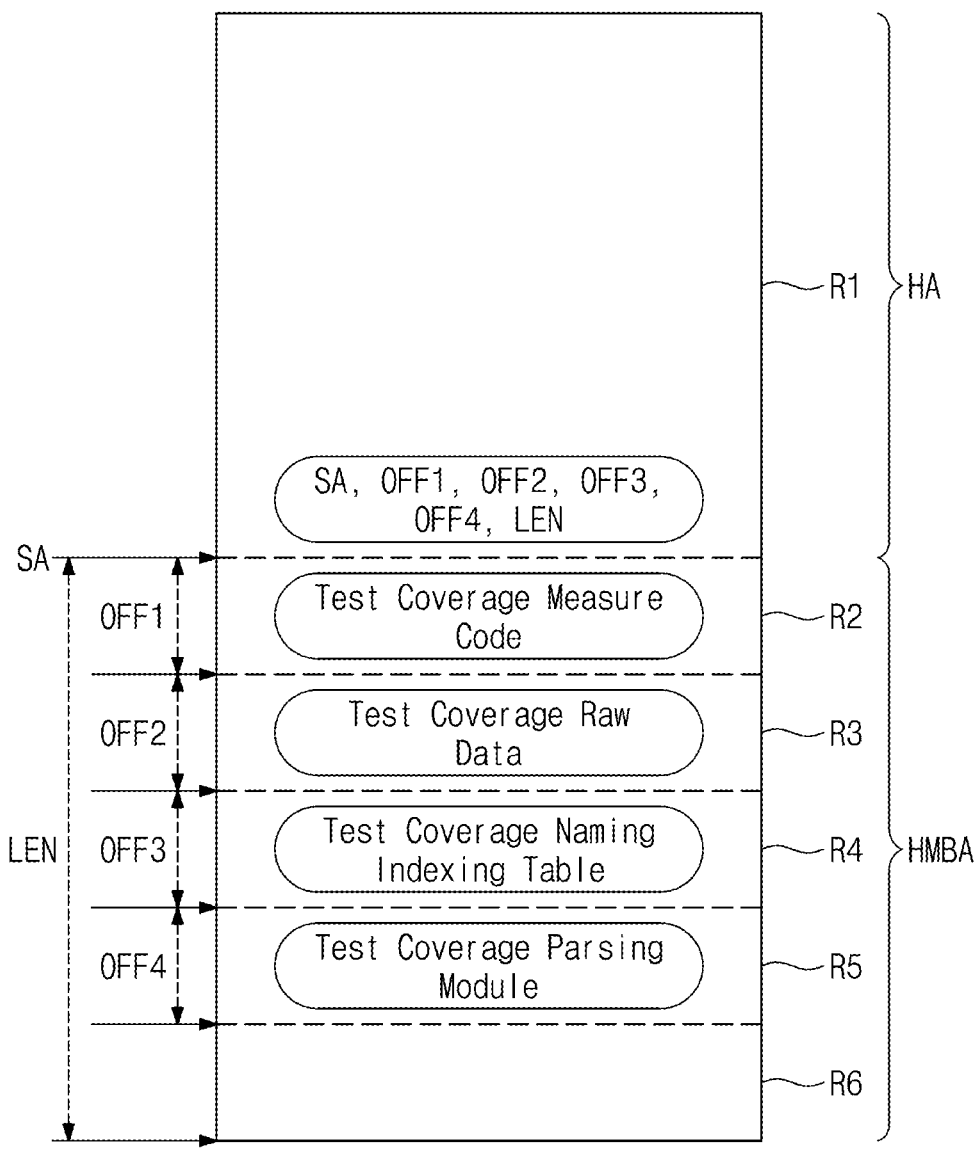
FIG. 7 illustrates an example in which a host processor allocates a host area and a host memory buffer area to a host memory of FIG. 6.

FIG. 7 illustrates an example in which a host processor allocates the host area HA and the host memory buffer area HMBA to the host memory 120 of FIG. 6. Referring to FIGS. 1, 2, and 7, the host processor 110 may allocate the first region R1 of the host memory 120 to the host area HA. The host processor 110 may allocate the second region R2, the third region R3, the fourth region R4, the fifth region R5, and the sixth region R6 of the host memory 120 to the host memory buffer area HMBA.

As illustrated in FIG. 7, when the host area HA and the host memory buffer area HMBA are allocated, the test coverage measure code, the test coverage raw data, the test coverage naming indexing table, and the test coverage parsing module may be accessed by the storage controller 210 of the storage device 200. Additionally, the address information including the start address SA, the first offset OFF1, the second offset OFF2, the third offset OFF3, the fourth offset OFF4, and the length information LEN may be accessed by the host processor 110.

The storage controller 210 may identify the second region R2, the third region R3, the fourth region R4, the fifth region R5, and the sixth region R6 based on the address information received from the host processor 110. For example, the storage controller 210 may identify the test coverage measure code based on the first address of the host memory buffer area HMBA. In an embodiment, to accurately identify the test coverage measure code, information about the size of the test coverage measure code may be added to the second region R2 (e.g., at the first address of the second region R2).

The storage controller 210 may identify the test coverage raw data based on the first address of the host memory buffer area HMBA and the first offset OFF1. For example, the storage controller 210 may identify the start address of the test coverage raw data by adding the first offset OFF1 to the first address of the second region R2. In an embodiment, to accurately identify the test coverage raw data, information about the size of the test coverage raw data may be added to the third region R3 (e.g., at the first address of the third region R3).

The storage controller 210 may identify the test coverage naming indexing table based on the first address of the third region R3 of the host memory buffer area HMBA and the second offset OFF2. For example, the storage controller 210 may identify the start address of the test coverage naming indexing table by adding the second offset OFF2 to the start address of the third region R3. In an embodiment, to accurately identify the test coverage naming indexing table, information about the size of the test coverage naming indexing table may be added to the fourth region R4 (e.g., at the first address of the fourth region R4).

The storage controller 210 may identify the test coverage parsing module based on the first address of the fourth region R4 of the host memory buffer area HMBA and the third offset OFF3. For example, the storage controller 210 may identify the start address of the test coverage parsing module by adding the third offset OFF3 to the start address of the fourth region R4. In an embodiment, to accurately identify the test coverage parsing module, information about the size of the test coverage parsing module may be added to the fifth region R5 (e.g., at the first address of the fifth region R5).

The storage controller 210 may identify the start address of the sixth region R6 based on the first address of the fifth region R5 of the host memory buffer area HMBA and the fourth offset OFF4. For example, the storage controller 210 may identify the start address of the sixth region R6 by adding the fourth offset OFF4 to the start address of the fifth region R5.

The storage controller 210 may identify the end address of the sixth region R6 based on the first address of the host memory buffer area HMBA and the length information LEN. For example, the storage controller 210 may identify the end address of the sixth region R6 by adding the length information LEN to the first address of the host memory buffer area HMBA.

In an embodiment, in a conventional scenario where the host memory buffer area HMBA is allocated, the storage controller 210 may be configured to initialize the storage space of the host memory buffer area HMBA. To prevent the initialization of the test coverage measure code, the test coverage raw data, the test coverage naming indexing table, and the test coverage parsing module, the host processor 110 may provide the storage controller 210 with information indicating the inhibition of the initialization of the host memory buffer area HMBA. For example, the host processor 110 may prevent the initialization of the host memory buffer area HMBA by setting a memory return bit of a set feature command requesting the allocation of the host memory buffer area HMBA to "1".

Figure 8:
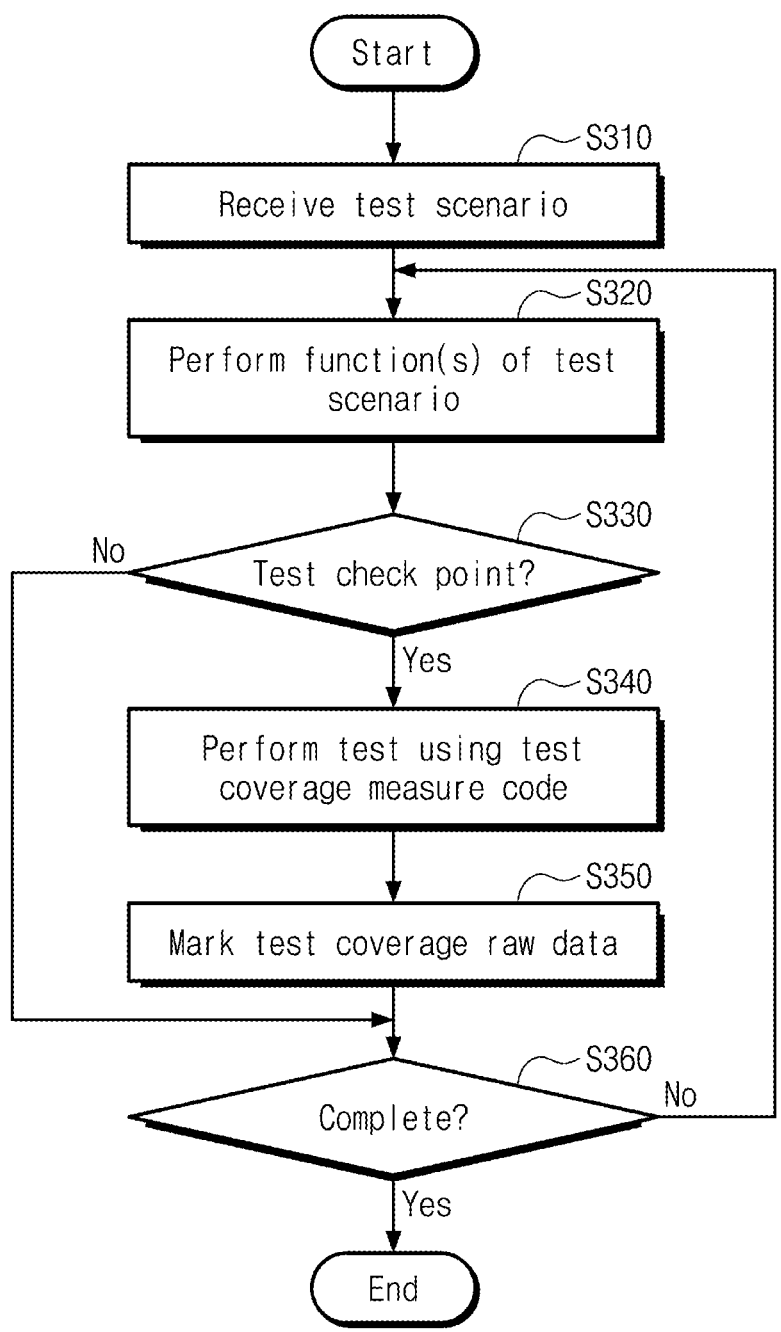
FIG. 8 illustrates an example of a process in which a storage device performs a test.

FIG. 8 illustrates an example of a process (operation S140 of FIG. 2) in which the storage device 200 performs the test. Referring to FIGS. 1, 7, and 8, in operation S310, the storage device 200 may receive the test scenario. For example, the storage controller 210 may receive the test scenario from the host processor 110. The test scenario may include a variety of commands that enable a storage controller to execute various functions independently, sequentially, or in combination.

In operation S320, the storage device 200 may perform a function(s) of the test scenario. The storage device 200 may execute a function(s) in response to the commands of the test scenario.

In operation S330, the storage device 200 may determine whether a test check point arrives. For example, in testing the storage device 200, revised firmware for the test may be loaded into the storage controller 210 of the storage device 200. The storage controller 210 may execute the revised firmware. The revised firmware may also include a function to determine the arrival of the test check point when the storage controller 210 executes a specific function, a specific sequence of functions, or a specific combination of functions. In an embodiment, after the testing of the storage device 200 is completed, the revised firmware may be replaced with conventional firmware which is not revised.

When the test check point does not arrive, the storage controller 210 may perform operation S360. When the test check point arrives, the storage controller 210 may perform operation S340. In operation S340, the storage controller 210 may perform the test by using the test coverage measure code.

For example, the storage controller 210 may read a test code corresponding to the currently arrived test check point from among the test codes of the test coverage measure code stored in the host memory buffer area HMBA of the host memory 120. The storage controller 210 may perform the test corresponding to the currently arrived test check point by executing the read test code.

In operation S350, the storage device 200 may mark the test coverage raw data. For example, the storage controller 210 of the storage device 200 may invert a value of a bit corresponding to the currently arrived test check point (or the currently performed test) from among the bits of the bitmap of the test coverage raw data. By marking the test coverage raw data, the storage controller 210 may record a test coverage at the host memory buffer area HMBA of the host memory 120.

After operation S350 or when the test check point does not arrive, the storage device 200 may perform operation S360. In operation S360, the storage device 200 may determine whether the test is completed. For example, the storage controller 210 of the storage device 200 may determine whether the execution of the test scenario is completed.

When the test is not completed, the procedure may progress to operation S320, and the storage controller 210 may perform a function(s) of the test scenario. In other words, the storage controller 210 may resume the execution of the test scenario. When the test is completed, the storage controller 210 may terminate the process associated with the test.

Figure 9:
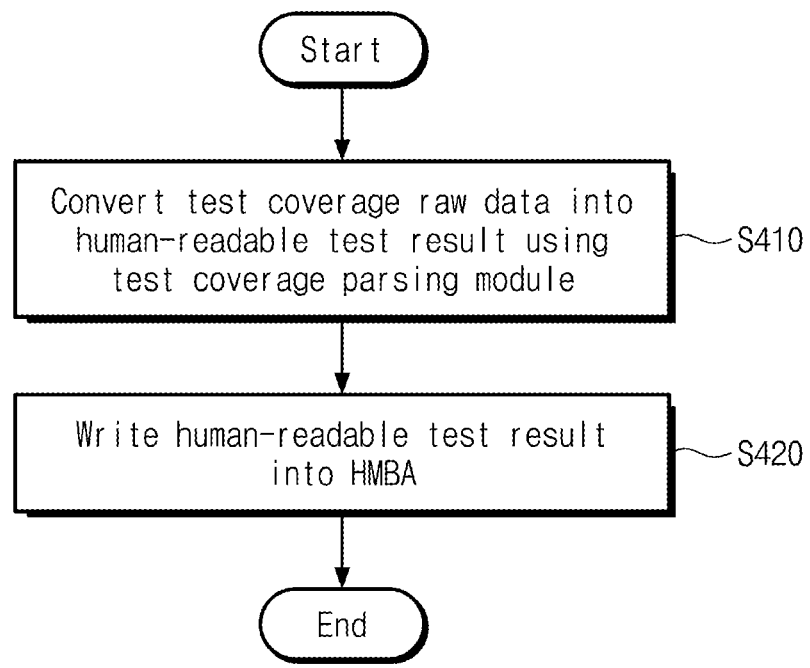
FIG. 9 illustrates an example of a process in which a storage device generates a human-readable test result

FIG. 9 illustrates an example of a process (operation S150 of FIG. 2) in which the storage device 200 generates the human-readable test result. Referring to FIGS. 1, 7, and 9, in operation S410, the storage device 200 may convert the test coverage raw data into the human-readable test result by using the test coverage parsing module.

For example, the storage controller 210 of the storage device 200 may read the test coverage parsing module stored in the host memory buffer area HMBA of the host memory 120. The storage controller 210 may execute the read test coverage parsing module.

The test coverage parsing module may detect bits with inverted values from among the bits of the bitmap of the test coverage raw data stored in the host memory buffer area HMBA of the host memory 120. The test coverage parsing module may identify whether the bits with the inverted values correspond to any tests by referring to the test coverage naming indexing table stored in the host memory buffer area HMBA. The test coverage parsing module may generate the human-readable test result by determining the correspondence of the inverted values to specific tests. In an embodiment, the human-readable test result may include character strings or images.

In operation S420, the storage device 200 may write the human-readable test result in the host memory buffer area HMBA of the host memory 120.

Figure 10:
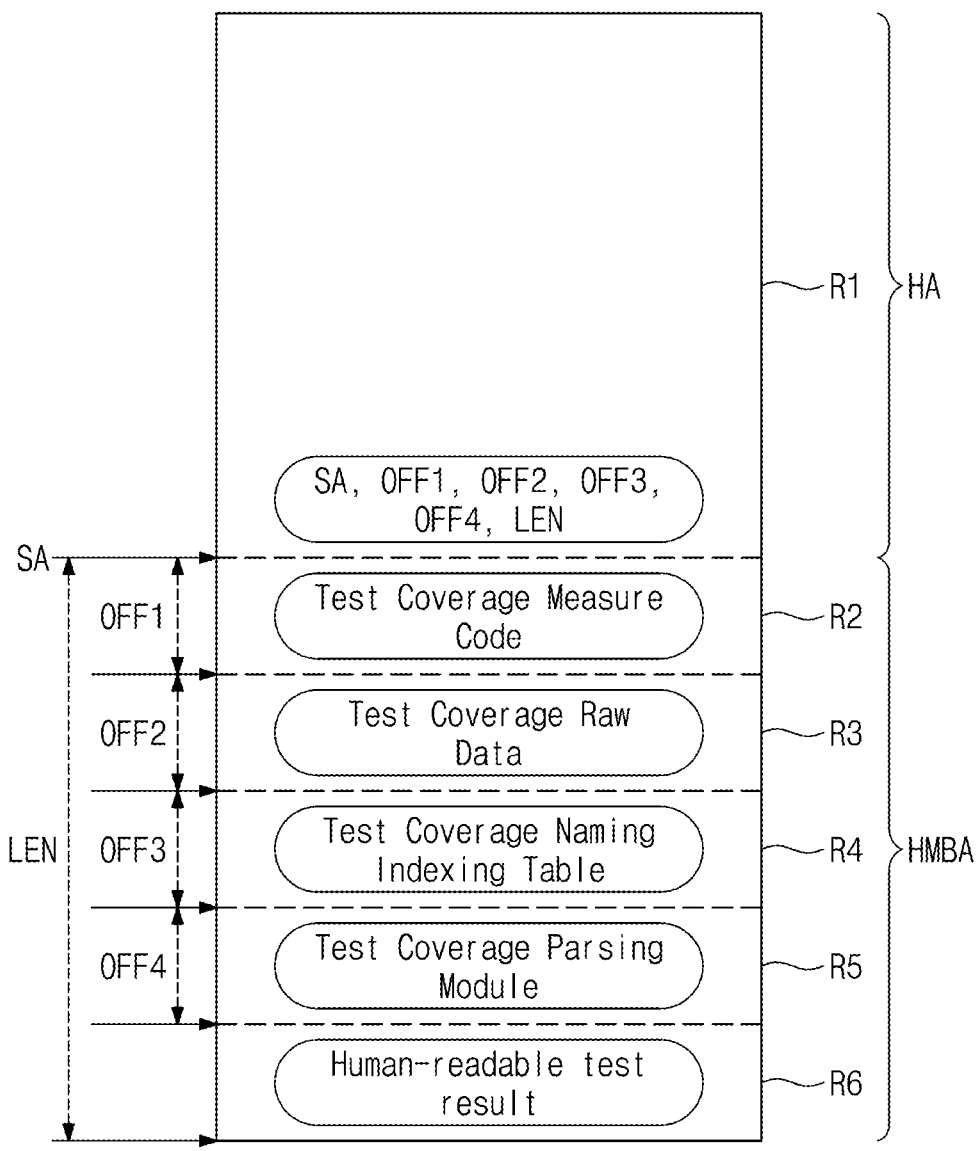
FIG. 10 illustrates an example in which a storage device writes a human-readable test result in a host memory of FIG. 7.

FIG. 10 illustrates an example in which the storage device 200 writes the human-readable test result in the host memory 120 of FIG. 7. Referring to FIGS. 1 and 10, the storage controller 210 of the storage device 200 may write the human-readable test result in the sixth region R6 of the host memory buffer area HMBA of the host memory 120. For example, the storage controller 210 may write the human-readable test result in a storage space with sequential addresses starting from the start address of the sixth region R6. In an embodiment, to accurately identify the human-readable test result, the storage controller 210 may further write information about the size of the human-readable test result in the sixth region R6 (e.g., at the start address of the sixth region R6).

Figure 11:
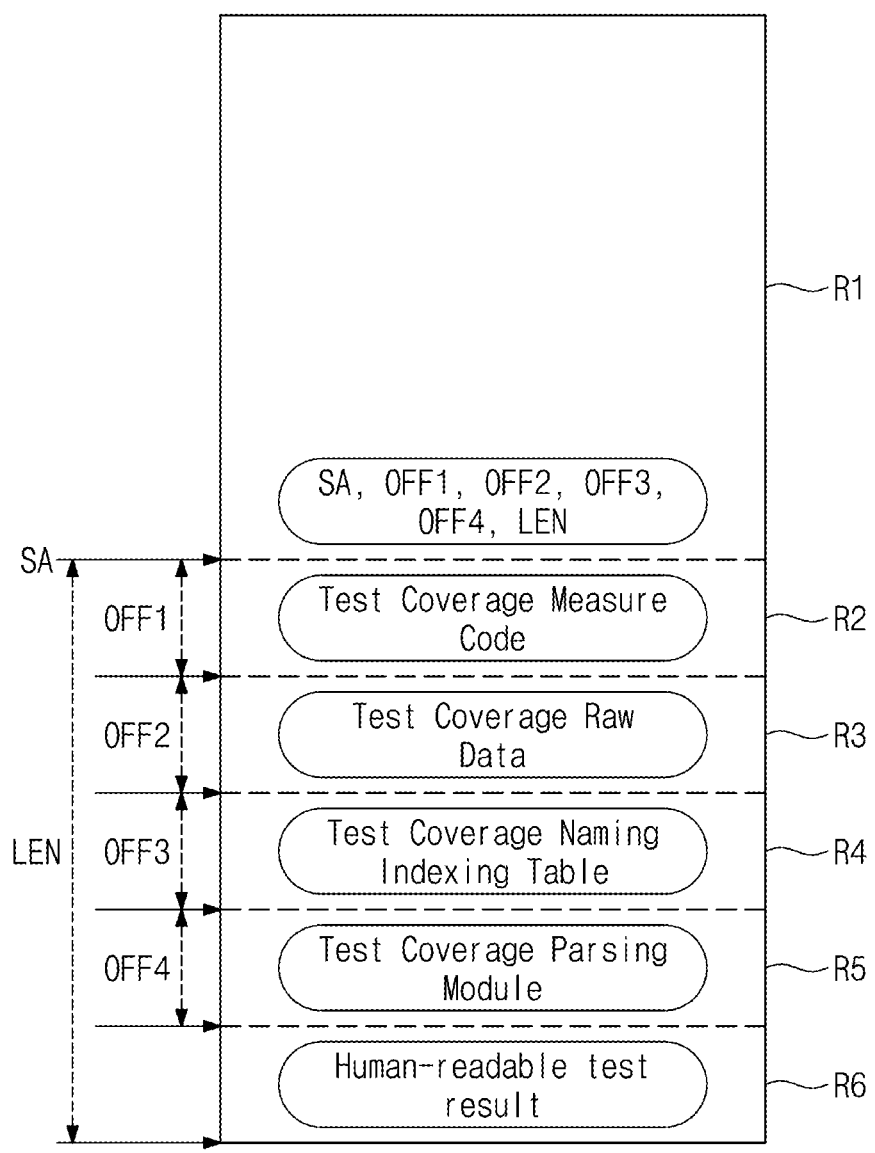
FIG. 11 illustrates an example in which a storage device releases a host memory buffer area from a host memory of FIG. 10.

FIG. 11 illustrates an example (e.g., operation S170 of FIG. 2) where the storage device 200 releases the host memory buffer area HMBA from the host memory 120 of FIG. 10. Referring to FIGS. 1 and 11, the entire storage space of the host memory 120 may be accessed by the host processor 110.

The host processor 110 may identify the sixth region R6 based on at least some of the start address SA, the first offset OFF1, the second offset OFF2, the third offset OFF3, the fourth offset OFF4, and the length information LEN stored in the first region R1. The host processor 110 may read the human-readable test result from the sixth region R6 as identified (in operation S180 of FIG. 2).

In an embodiment, an example of performing the test using the test coverage measure code, the test coverage raw data, the test coverage naming indexing table, and the test coverage parsing module is described in detail. However, the number of data, codes, or modules used for testing the storage device 200, as well as their names, and functions are not limited.

Figure 12:
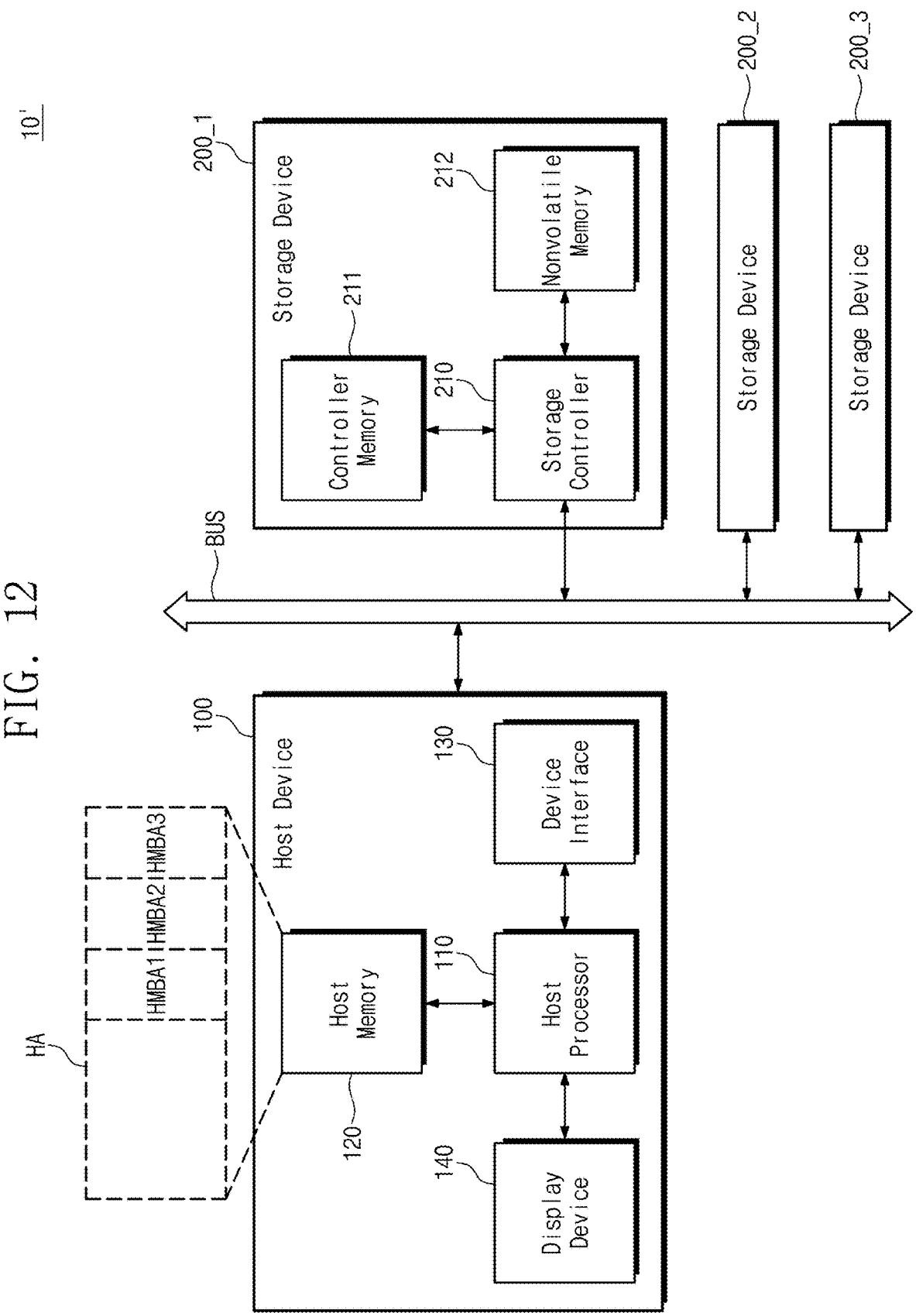
FIG. 12 illustrates a test system according to an application example of the test system FIG. 1.

FIG. 12 illustrates a test system 10' according to an application example of the test system 10 of FIG. 1. Referring to FIG. 12, the test system 10' may include a bus "BUS", the host device 100, a first storage device 200_1, a second storage device 200_2, and a third storage device 200_3.

The host device 100, the first storage device 200_1, the second storage device 200_2, and the third storage device 200_3 may be connected to the bus "BUS". For example, the bus "BUS" may be a switch which operates based on the PCIe or the NVMe. The bus "BUS" may transfer requests (e.g., packets) provided from the host device 100 to any one of the first storage device 200_1, the second storage device 200_2, and the third storage device 200_3. Additionally, the bus "BUS" may transfer a response or data (e.g., packets) provided from any one of the first storage device 200_1, the second storage device 200_2, and the third storage device 200_3 to the host device 100.

The host device 100 may correspond to the host device 100 described with reference to FIG. 1. Each of the first storage device 200_1, the second storage device 200_2, and the third storage device 200_3 may correspond to the storage device 200 described with reference to FIG. 1.

The host processor 110 may test the first storage device 200_1, the second storage device 200_2, and the third storage device 200_3. Depending on the method described with reference to FIG. 2, the host processor 110 may allocate a first host memory buffer area HMBA1 of the host memory 120 to the first storage device 200_1 and may initiate the testing of the first storage device 200_1. The host processor 110 may arbitrate the access of the first storage device 200_1 to the first host memory buffer area HMBA1.

While the first storage device 200_1 performs the test, depending on the method described with reference to FIG. 2, the host processor 110 may allocate a second host memory buffer area HMBA2 of the host memory 120 to the second storage device 200_2 and may initiate the testing of the second storage device 200_2. The host processor 110 may arbitrate the access of the first storage device 200_1 to the first host memory buffer area HMBA1 and the access of the second storage device 200_2 to the second host memory buffer area HMBA2.

While the first storage device 200_1 and the second storage device 200_2 perform the test, depending on the method described with reference to FIG. 2, the host processor 110 may allocate a third host memory buffer area HMBA3 of the host memory 120 to the third storage device 200_3 and may initiate the testing of the third storage device 200_3. The host processor 110 may arbitrate the access of the first storage device 200_1 to the first host memory buffer area HMBA1, the access of the second storage device 200_2 to the second host memory buffer area HMBA2, and the access of the third storage device 200_3 to the third host memory buffer area HMBA3.

As described above, because the host processor 110 does not directly control the testing of the first storage device 200_1, the second storage device 200_2, and the third storage device 200_3, the host processor 110 may allocate two or more host memory buffer areas, each corresponding to a different storage device, within the host memory 120. The host processor 110 may initiate the tests for the different storage devices using the two or more host memory buffer areas. While the two or more storage devices perform their tests, the host processor 110 may arbitrate their access to the corresponding host memory buffer areas.

As the test system 10' simultaneously tests the two or more different storage devices, the test system 10' may shorten the test time of the storage devices.

Figure 13:
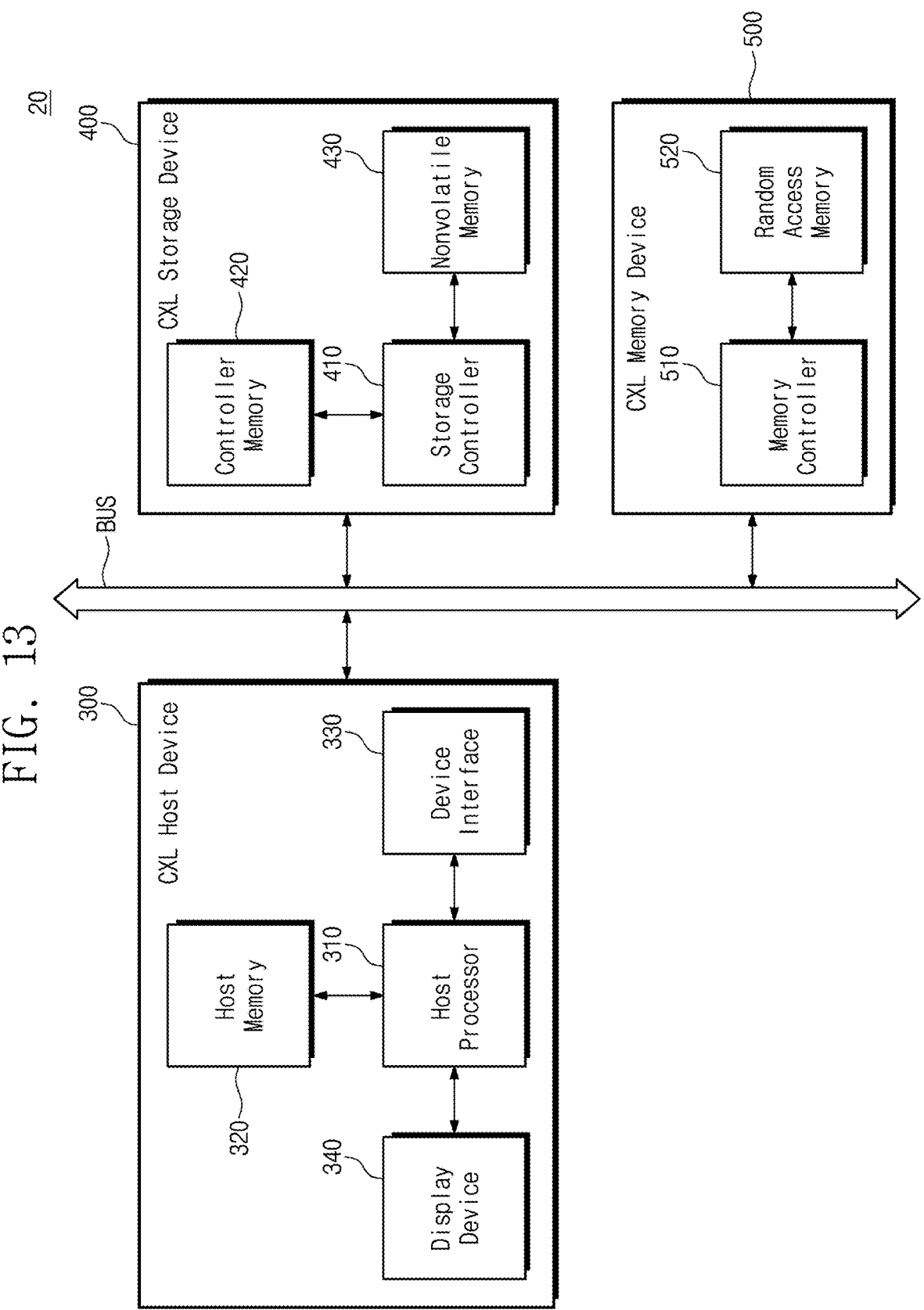
FIG. 13 illustrates a test system according to a second embodiment of the present disclosure.

FIG. 13 illustrates a test system 20 according to a second embodiment of the present disclosure. Referring to FIG. 13, the test system 20 may include the bus "BUS", a CXL host device 300, a CXL storage device 400, and a CXL memory device 500.

The bus "BUS" may be a switch which is based on the NVMe or the PCIe and supports the compute express link (CXL). The bus "BUS" may support the communication between the CXL host device 300 and the CXL storage device 400 and the communication between the CXL host device 300 and the CXL memory device 500. Additionally, the bus "BUS" may support 1:1 communication between the CXL storage device 400 and the CXL memory device 500, for example, the peer-to-peer communication between the CXL storage device 400 and the CXL memory device 500.

The CXL host device 300 may include a host processor 310, a host memory 320, a device interface 330, and a display device 340. The host processor 310 may execute an operating system and various applications of the CXL host device 300. Depending on a request of the operating system or the applications, the host processor 310 may control components of the CXL host device 300 and communicate with the CXL storage device 400. For example, the host processor 310 may include a central processing unit (CPU). The host processor 310 may include a plurality of cores or hardware accelerators which operate independently collaboratively.

The host memory 320 may be a main memory of the CXL host device 300. The host memory 320 may be accessed by the host processor 310. For example, the host memory 320 may include a random access memory such as a dynamic random access memory (DRAM), a static RAM (SRAM), a phase-change RAM (PRAM), a magnetic RAM (MRAM), a ferroelectric RAM (FRAM), or a resistive RAM (RRAM).

The host memory 320 may include two or more memory modules where two or more memory packages are mounted. For example, the host memory 320 may communicate with the host processor 310 using the dual in-line memory module (DIMM) standard.

The device interface 330 may provide an interface for communicating with an external device. For example, the device interface 330 may be configured to communicate with the CXL storage device 400 and the CXL memory device 500, using the NVMe, the PCIe or the CXL standards.

The display device 340 may display information stored in the host memory 320 to the user. For example, the display device 340 may be implemented in various forms, for example, the display device 340 may be implemented with a light emitting diode (LED) display device or a liquid crystal display (LCD) device.

The CXL storage device 400 may perform various operations, such as a write operation, a read operation, and an erase operation, based on a request of the CXL host device 300. The CXL storage device 400 may perform various background operations to manage the CXL storage device 400 in the absence of a request from the CXL host device 300. In an embodiment, the CXL storage device 400 may be tested by the CXL host device 300.

The CXL storage device 400 may include a storage controller 410, a controller memory 420, and a nonvolatile memory 430. The storage controller 410 and the controller memory 420 may each be implemented in hardware as a circuit.

The storage controller 410 may communicate with the CXL host device 300 using the NVMe, the PCIe, or the CXL standards. The storage controller 410 may communicate with the CXL memory device 500 through the CXL.

The storage controller 410 may access the controller memory 420 and the nonvolatile memory 430. The storage controller 410 may include two or more processing cores for executing firmware to manage the CXL storage device 400, performing various operations based on a request from the CXL host device 300, and carrying out various background operations.

The storage controller 410 may test the CXL storage device 400 based on a request of the CXL host device 300. For example, the storage controller 410 may test the CXL storage device 400 by accessing the controller memory 420, accessing the nonvolatile memory 430, and performing various internal functions.

In an embodiment, the storage controller 410 may include an internal memory configured to load codes of the firmware and metadata for managing the CXL storage device 400. For example, the internal memory may include an SRAM or a DRAM.

The controller memory 420 may be used as a buffer memory or a cache memory which stores various data communicated with the CXL host device 300. The controller memory 420 may be used to store mapping data (e.g., a mapping table) that indicates the mapping relationship between logical addresses allocated by the CXL host device 300 to the CXL storage device 400 and the physical addresses of the nonvolatile memory 430.

For example, the controller memory 420 may be implemented with a random access memory such as a DRAM, a PRAM, a DRAM, an FRAM, or an RRAM. In an embodiment, the controller memory 420 may be integrated with an internal memory of the storage controller 410. When the controller memory 420 is not included in the CXL storage device 400, the functions of the controller memory 420 may be performed by using the internal memory of the storage controller 410.

The nonvolatile memory 430 may include various nonvolatile memories such as a flash memory, a phase-change memory, a magnetic memory, a ferroelectric memory, and a resistive memory. A first portion of the storage space of the nonvolatile memory 430 may be used to store data of the CXL host device 300. A second portion of the storage space of the nonvolatile memory 430 may be used as a reserved area to store the mapping data and the metadata for managing the CXL storage device 400, or it may be used as an over-provisioning area to enhance the performance of the CXL storage device 400.

The CXL memory device 500 may include a memory controller 510 and a random access memory 520. The memory controller 501 may be implemented in hardware as a circuit. The memory controller 510 may communicate with the CXL host device 300 based on the NVMe, the PCIe, or the CXL standard. The memory controller 510 may communicate with the CXL storage device 400 through the CXL. The memory controller 510 may access the random access memory 520. The memory controller 510 may support the testing of the CXL storage device 400 based on a request from the CXL host device 300. The random access memory 520 may be implemented with one among various random access memories such as a DRAM, a PRAM, an MRAM, an FRAM, and an RRAM.

Figure 14:
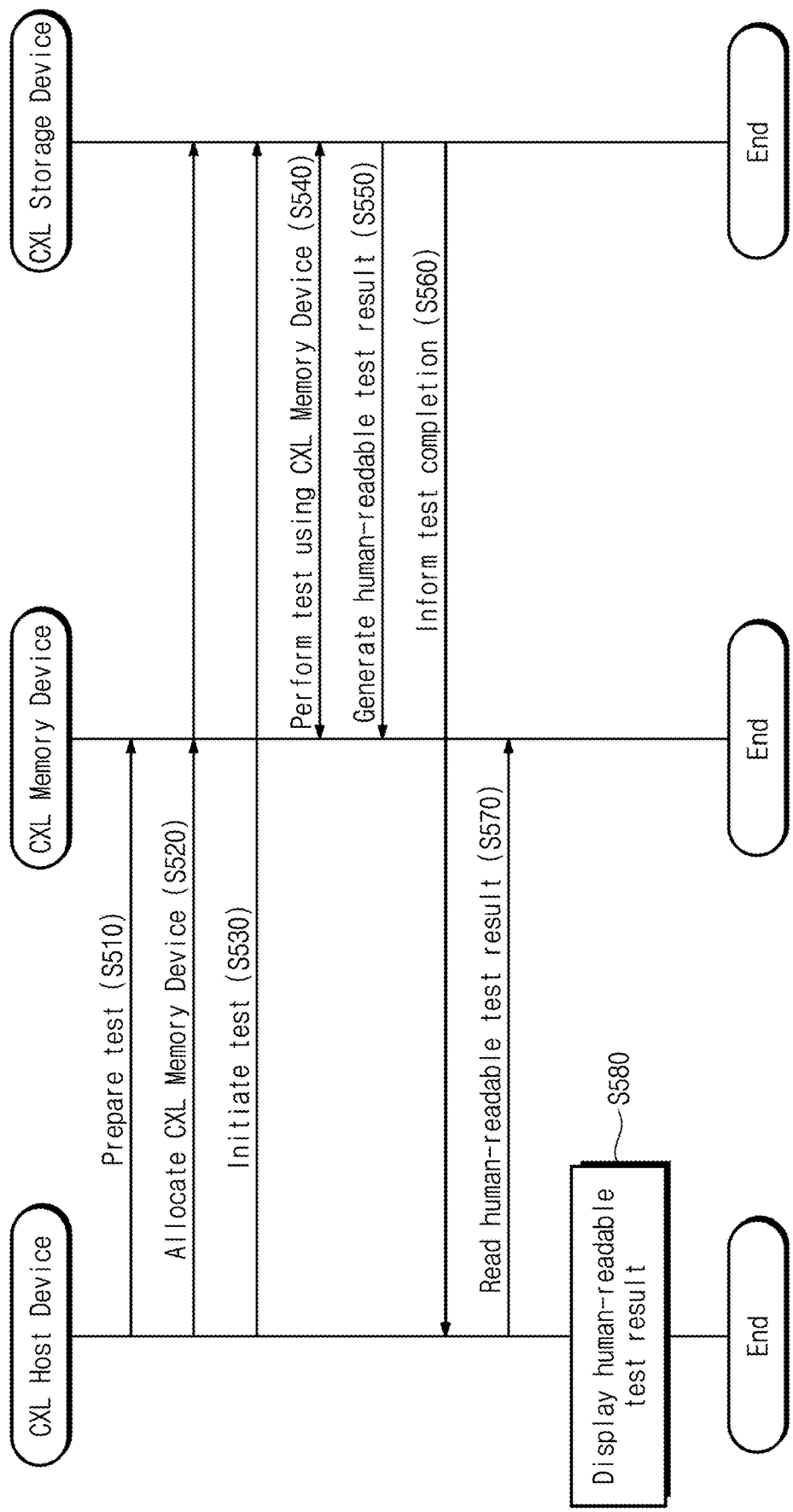
FIG. 14 illustrates a method of testing a CXL storage device, according to a second embodiment of the present disclosure.

FIG. 14 illustrates a method of testing the CXL storage device 400 according to the second embodiment of the present disclosure. Referring to FIGS. 13 and 14, in operation S510, the CXL host device 300 may prepare a test in the CXL memory device 500. For example, the CXL host device 300 may load various data or codes necessary for the testing of the CXL storage device 400 to the CXL memory device 500.

In operation S520, the CXL host device 300 may allocate the CXL memory device 500. For example, the CXL host device 300 may allocate a portion of the storage space within the CXL memory device 500, where the data or codes are loaded at least in operation S510, to be used by the CXL storage device 400. In an embodiment, the CXL host device 300 may transmit address information about the storage space of the CXL memory device 500, where the data or codes are loaded, to the CXL storage device 400.

In operation S530, the CXL host device 300 may initiate the test of the CXL storage device 400. For example, the CXL host device 300 may initiate the test of the CXL storage device 400 by transmitting a test scenario to the CXL storage device 400. For example, the test scenario may include various commands for executing various functions of the CXL storage device 400 independently, sequentially, or in combination.

In operation S540, the CXL storage device 400 may perform the test by using the CXL memory device 500. For example, the storage controller 410 may transmit requests to access the CXL memory device 500 through the bus "BUS" based on the CXL. The memory controller 510 of the CXL memory device 500 may access the random access memory 520 in response to the request of the CXL storage device 400. The memory controller 510 may then transfer the access result back to the CXL storage device 400 through the bus "BUS" based on the CXL. In other words, the CXL host device 300 does not intervene in the access of the CXL storage device 400 to the CXL memory device 500.

In an embodiment, the storage controller 410 may test the CXL storage device 400 by using the data or codes loaded to the random access memory 520 of the CXL memory device 500. The storage controller 410 may record the result of the test, for example, information the test coverage in the random access memory 520 of the CXL memory device 500. For example, the storage controller 410 may record the information about the test coverage in the form of a bitmap.

In operation S550, the CXL storage device 400 may generate the human-readable test result by using the random access memory 520 of the CXL memory device 500. For example, the storage controller 410 may convert the bitmap, which includes the information about the test coverage, into the human-readable test result using the data or codes loaded to the random access memory 520 of the CXL memory device 500. The human-readable test result may present the test coverage information as character strings or images that can be easily understood by humans. The storage controller 410 may write the human-readable test result in the random access memory 520 of the CXL memory device 500.

In operation S560, the CXL storage device 400 may notify the CXL host device 300 that the test is completed. For example, after the storage controller 410 generates the human-readable test result and writes it in the random access memory 520 of the CXL memory device 500, the storage controller 410 may transmit a signal to the CXL host device 300 to notify that the test is completed.

In operation S570, the CXL host device 300 may read the human-readable test result from the CXL memory device 500. In operation S580, the CXL host device 300 may display the human-readable test result. For example, the CXL host device 300 may display the human-readable test result by using the display device 340.

As described above, according to an embodiment of the present disclosure, the CXL storage device 400 is tested using the CXL memory device 500, rather than the controller memory 420 of the CXL storage device 400 or the internal memory of the storage controller 410. This approach prevents the test of the CXL storage device 400 from being restricted or delayed due to limitations on the CXL storage device's 400 resources, thereby improving the convenience of testing the CXL storage device 400.

Additionally, while the CXL storage device 400 is being tested, the CXL host device 300 may not participate in the testing of the CXL storage device 400. Accordingly, the CXL host device 300 can perform other tasks while the CXL storage device 400 is being tested.

In an embodiment, the test of the CXL storage device 400 may be performed deterministically with the CXL storage device 400 completing the test during a preset time. In this case, operation S560 may be omitted, and the CXL host device 300 may perform operation S570 after the preset time has elapsed from the start of the test of the CXL storage device 400 in operation S530.

Figure 15:
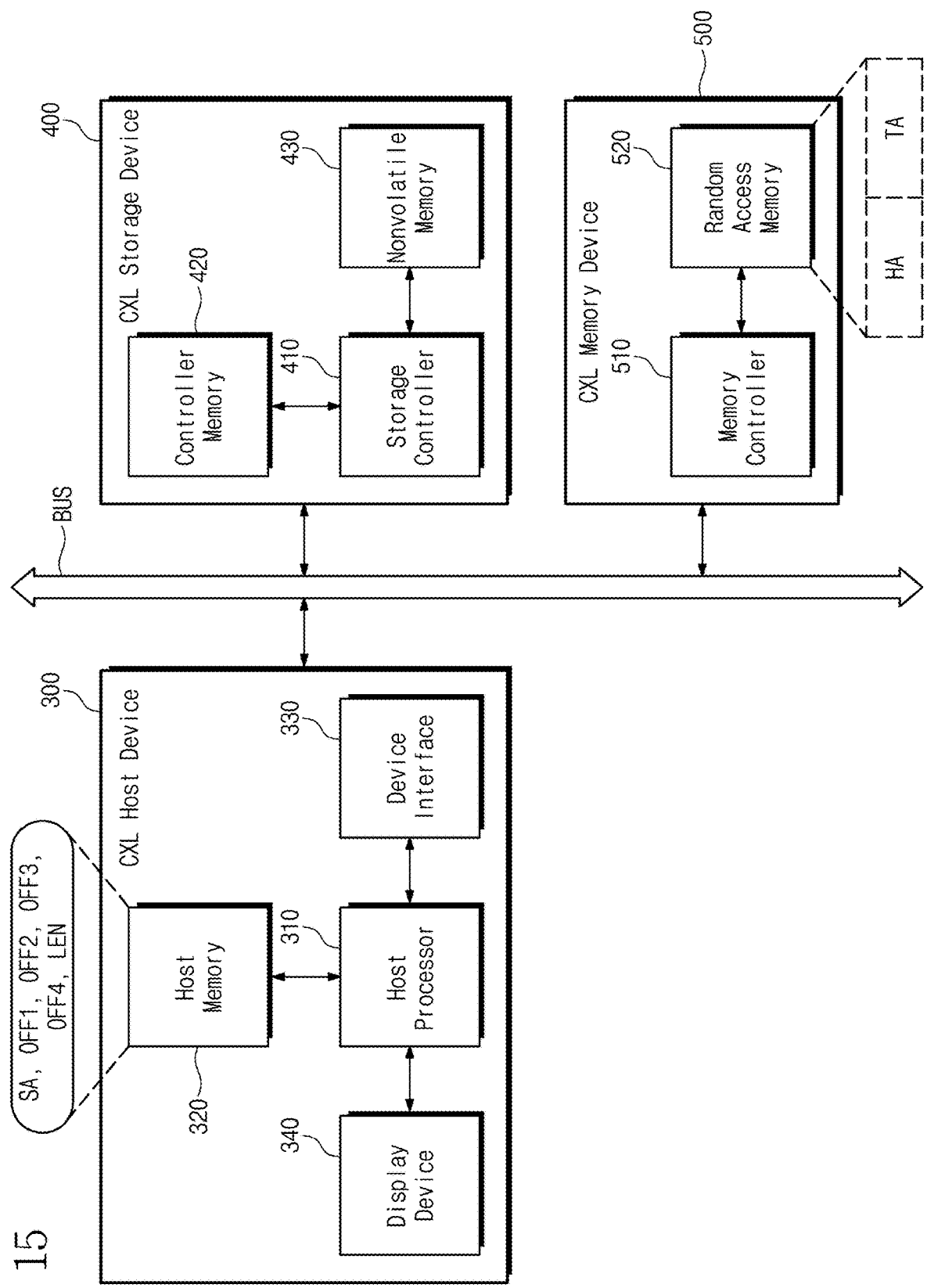
FIG. 15 illustrates a first example in which a CXL host device tests a CXL storage device by using a CXL memory device according to the method of FIG. 14.

FIG. 15 illustrates a first example in which the CXL host device 300 tests the CXL storage device 400 by using the CXL memory device 500 according to the method of FIG. 14. Referring to FIG. 15, the CXL host device 300 may partition the storage space of the CXL memory device 500, for example, the storage space of the random access memory 520, into the host area HA and a test area TA. The CXL host device 300 may use the host area HA as an expanded memory of the host memory 320.

The CXL host device 300 may partition the test area TA into the second region R2, the third region R3, the fourth region R4, the fifth region R5, and the sixth region R6 described with reference to FIGS. 1 to 11. The CXL host device 300 may store the address information including the start address SA, the first offset OFF1, the second offset OFF2, the third offset OFF3, the fourth offset OFF4, and the length information LEN in the host memory 320. The CXL host device 300 may transfer the address information stored in the host memory 320 to the CXL storage device 400.

Figure 16:
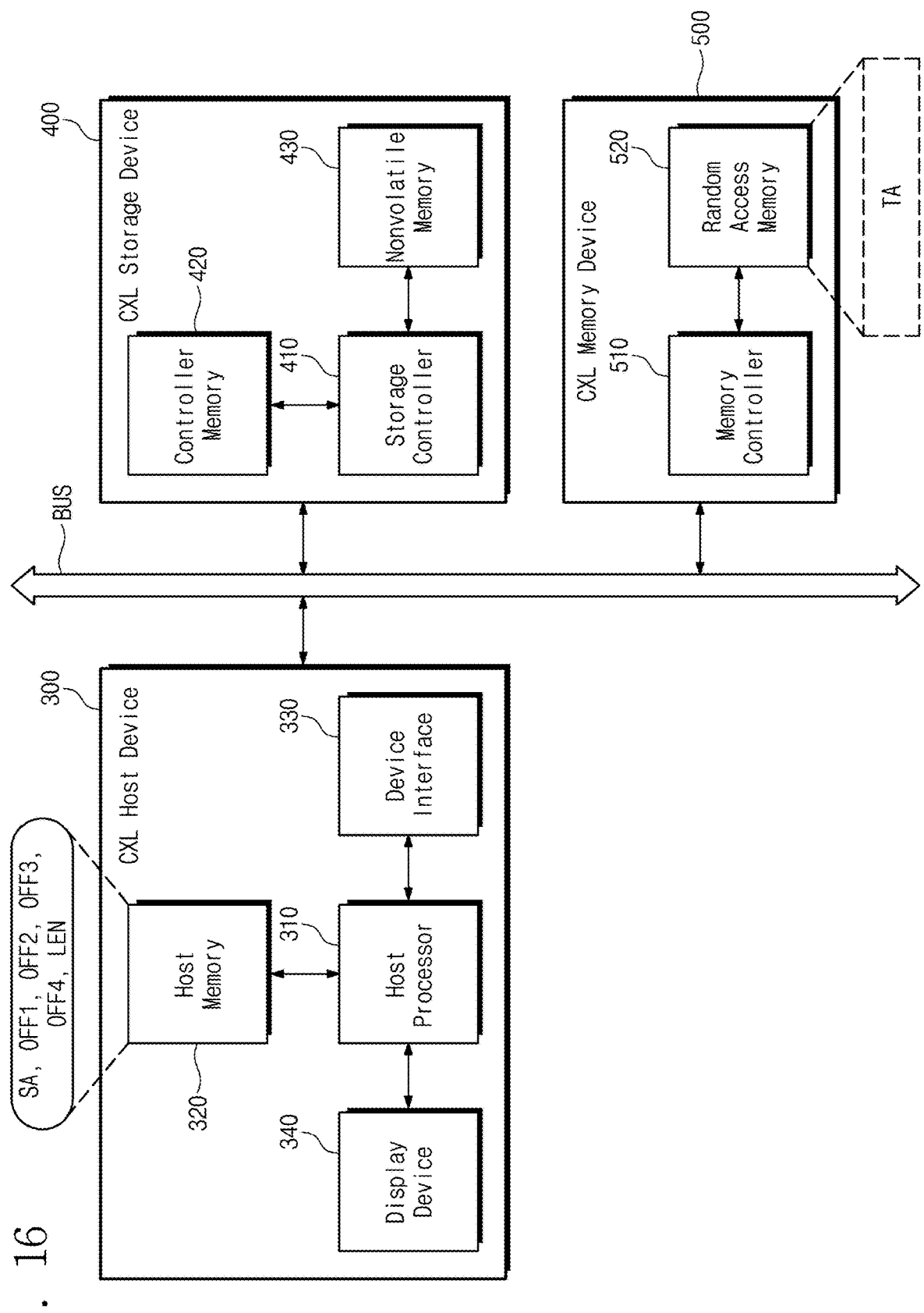
FIG. 16 illustrates a second example in which a CXL host device tests a CXL storage device by using a CXL memory device according to the method of FIG. 14.

FIG. 16 illustrates a second example in which the CXL host device 300 tests the CXL storage device 400 by using the CXL memory device 500 according to the method of FIG. 14. Compared to FIG. 15, referring to FIG. 16, the CXL host device 300 may use the storage space of the CXL memory device 500, for example, the storage space of the random access memory 520, as the test area TA. Because the CXL host device 300 includes the host memory 320, the CXL host device 300 may use the entire storage space of the random access memory 520 of the CXL memory device 500 as the test area TA.

Figure 17:
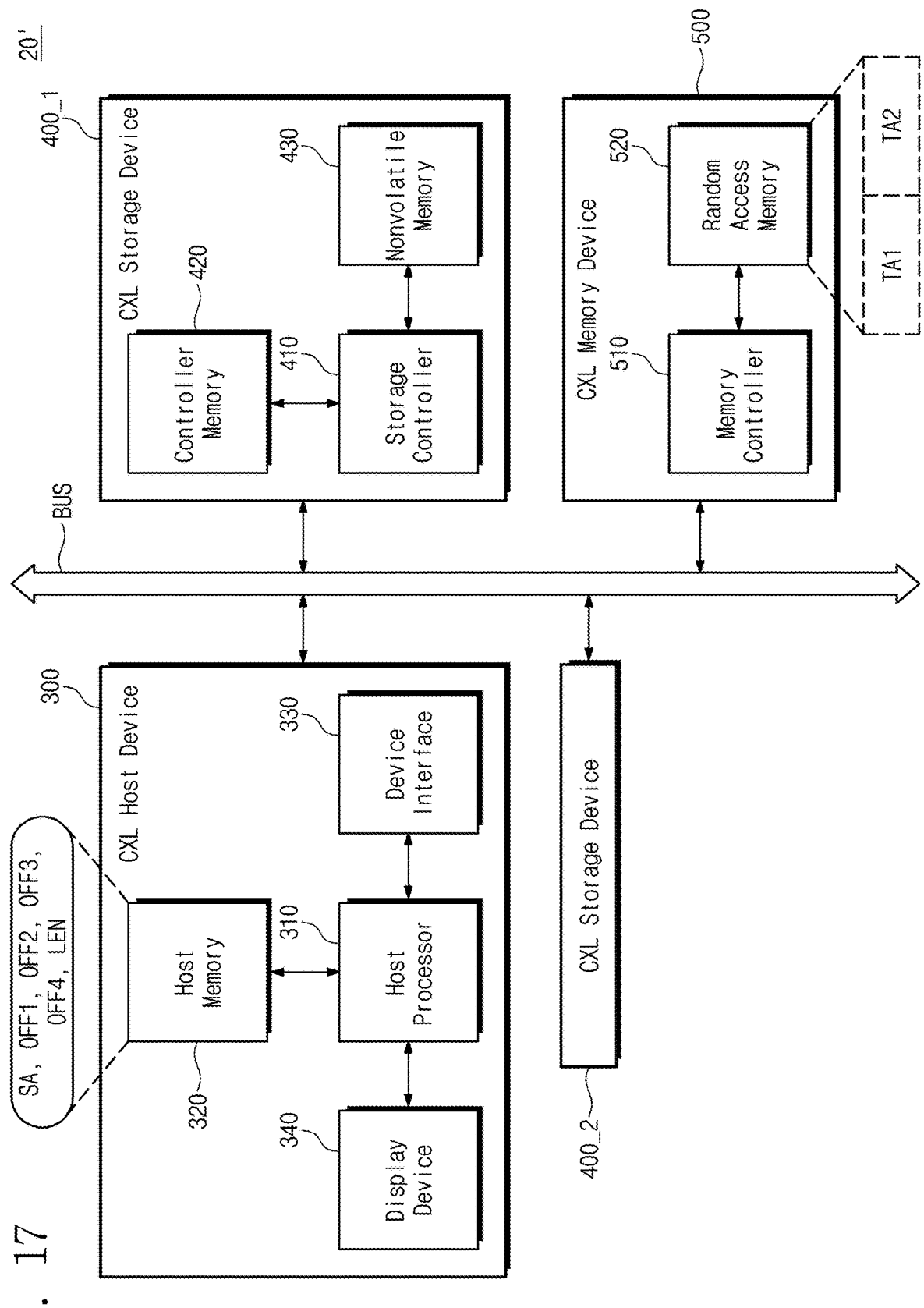
FIG. 17 illustrates a test system according to an application example of a test system of FIG. 16.

FIG. 17 illustrates a test system 20' according to an application example of the test system 20 of FIG. 16. Referring to FIG. 17, the test system 20' may include the bus "BUS", the CXL host device 300, a first CXL storage device 400_1, a second CXL storage device 400_2, and the CXL memory device 500.

The bus "BUS" may be a switch based on NVMe or PCIe that supports CXL. The bus "BUS" may facilitate communication between the CXL host device 300 and the first CXL storage device 400_1, between the CXL host device 300 and the second CXL storage device 400_2, and between the CXL host device 300 and the CXL memory device 500. Additionally, the bus "BUS" may support 1:1 communication between the first CXL storage device 400_1, the second CXL storage device 400_2, and the CXL memory device 500, enabling peer-to-peer communication among these devices.

The CXL host device 300 may test the first CXL storage device 400_1 and the second CXL storage device 400_2 by using the CXL memory device 500. Each of the first CXL storage device 400_1 and the second CXL storage device 400_2 may correspond to the CXL storage device 400 described with reference to FIG. 13.

The CXL host device 300 may partition the storage space of the random access memory 520 of the CXL memory device 500 into a first test area TA1 and a second test area TA2. For testing the first CXL storage device 400_1, the CXL host device 300 may allocate the first test area TA1 to the first CXL storage device 400_1. Similarly, for testing the second CXL storage device 400_2, the CXL host device 300 may allocate the second test area TA2 to the second CXL storage device 400_2.

The CXL host device 300 may partition each of the first test area TA1 and the second test area TA2 into the second region R2, the third region R3, the fourth region R4, the fifth region R5, and the sixth region R6 described with reference to FIGS. 1 to 11. The CXL host device 300 may store address information including the start address SA, the first offset OFF1, the second offset OFF2, the third offset OFF3, the fourth offset OFF4, and the length information LEN of each of the first test area TA1 and the second test area TA2 in the host memory 320. The CXL host device 300 may transfer the address information stored in the host memory 320 to both the first CXL storage device 400_1 and the second CXL storage device 400_2.

Figure 18:
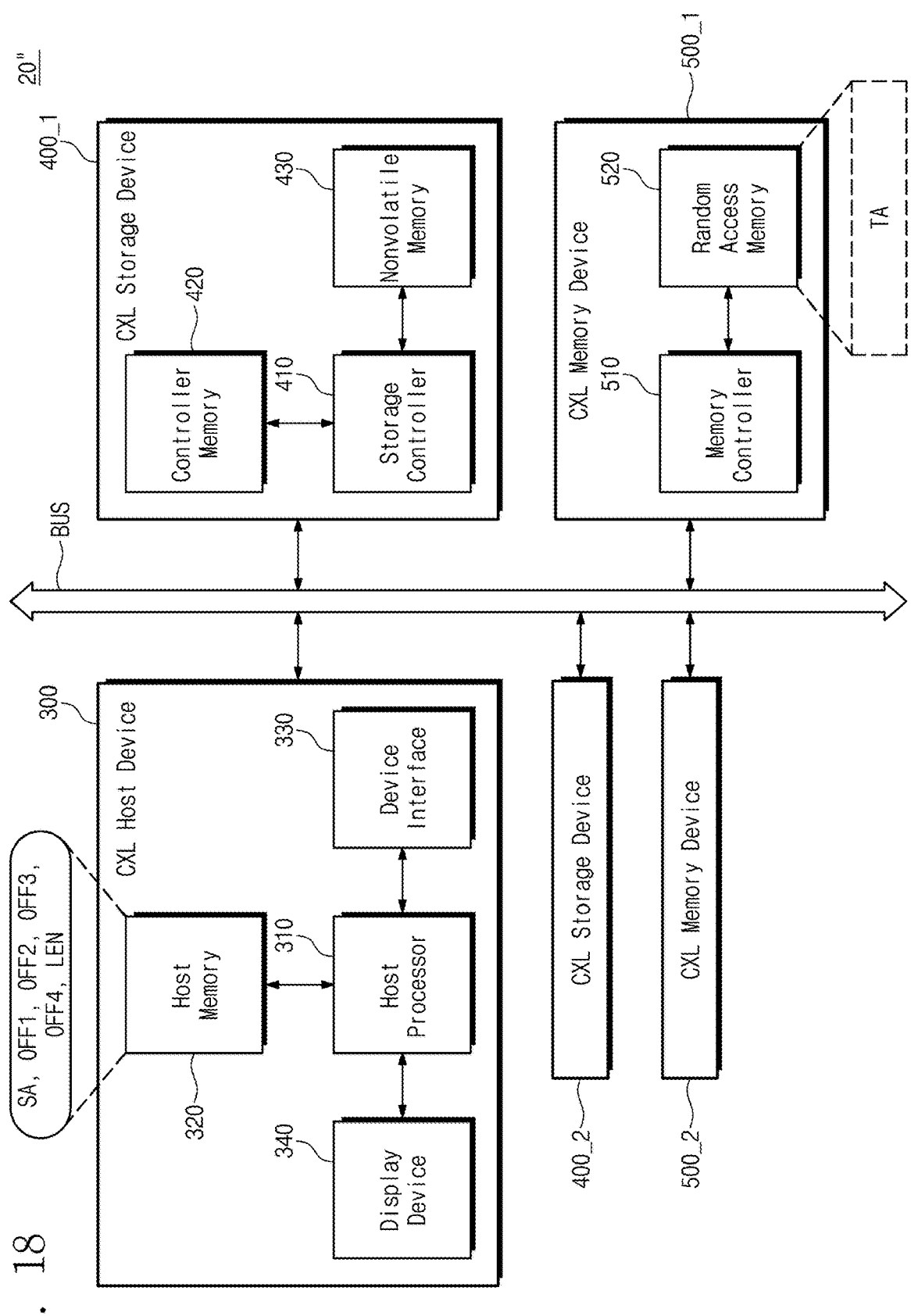
FIG. 18 illustrates a test system according to an application example of a test system of FIG. 16.

FIG. 18 illustrates a test system 20" according to an application example of the test system 20 of FIG. 16. Referring to FIG. 18, the test system 20" may include the bus "BUS", the CXL host device 300, the first CXL storage device 400_1, the second CXL storage device 400_2, a first CXL memory device 500_1, and a second CXL memory device 500_2.

The bus "BUS" may be a switch based on NVMe or PCIe that supports CXL. The bus "BUS" may facilitate communication between the CXL host device 300 and the first CXL storage device 400_1, between the CXL host device 300 and the second CXL storage device 400_2, between the CXL host device 300 and the first CXL memory device 500_1, and between the CXL host device 300 and the second CXL memory device 500_2. Additionally, the bus "BUS" may support 1:1 communication between the first CXL storage device 400_1, the second CXL storage device 400_2, the first CXL memory device 500_1, and the second CXL memory device 500_2, enabling peer-to-peer communication between these devices.

The CXL host device 300 may test the first CXL storage device 400_1 using the first CXL memory device 500_1 and the second CXL storage device 400_2 using the second CXL memory device 500_2. Each of the first CXL storage device 400_1 and the second CXL storage device 400_2 may correspond to the CXL storage device 400 described with reference to FIG. 13. Each of the first CXL memory device 500_1 and the second CXL memory device 500_2 may correspond to the CXL memory device 500 described with reference to FIG. 13.

For testing the first CXL storage device 400_1, the CXL host device 300 may allocate the storage space of the random access memory 520 of the first CXL memory device 500_1 to the first CXL storage device 400_1 as the test area TA. For testing the second CXL storage device 400_2, the CXL host device 300 may allocate the storage space of the random access memory 520 of the second CXL memory device 500_2 to the second CXL storage device 400_2 as the test area TA.

The CXL host device 300 may partition the test area TA of each of the first CXL memory device 500_1 and the second CXL memory device 500_2 into the second region R2, the third region R3, the fourth region R4, the fifth region R5, and the sixth region R6 described with reference to FIGS. 1 to 11. The CXL host device 300 may store address information including the start address SA, the first offset OFF1, the second offset OFF2, the third offset OFF3, the fourth offset OFF4, and the length information LEN of the test area TA of each of the first CXL memory device 500_1 and the second CXL memory device 500_2 in the host memory 320. The CXL host device 300 may transfer the address information stored in the host memory 320 to both the first CXL storage device 400_1 and the second CXL storage device 400_2.

As described above, the first CXL storage device 400_1, the second CXL storage device 400_2, the first CXL memory device 500_1, and the second CXL memory device 500_2 may perform 1:1 communication in a P2P manner without the intervention of the CXL host device 300. Consequently, the first CXL storage device 400_1 and the second CXL storage device 400_2 may be tested without increasing the overhead of the CXL host device 300.

In the above embodiments, components according to the present disclosure are described using the terms "first", "second", "third", etc. However, these terms are used to distinguish components from each other and do not limit the present disclosure. For example, the terms "first", "second", "third", etc. do not any specific order or numerical significance.

In the above embodiments, components according to embodiments of the present disclosure are referenced using blocks. These blocks may be implemented with various hardware devices, such as an integrated circuit, an application specific integrated circuit (ASIC), a field programmable gate array (FPGA), and a complex programmable logic device (CPLD), firmware driven in hardware devices, software such as an application, or a combination of a hardware device and software. Additionally, the blocks may include circuits implemented with semiconductor elements in an integrated circuit, or circuits registered as an intellectual property (IP).

According to embodiments of the present disclosure, a storage device may be tested by using resources located outside the storage device. Consequently, a storage device providing improved test convenience and a method for testing the storage device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:
a nonvolatile memory; and
a controller configured to control the nonvolatile memory, wherein the controller is configured to:
obtain authority to access an external memory, wherein the external memory is allocated by an external host device;
receive a test scenario, which includes a plurality of commands, from the external host device;
read a first test code corresponding to a first test check point from the external memory when the first test check point arrives while the test scenario is executed; and
execute the first test code.

2. The storage device of claim 1, wherein the controller is configured to:
resume the test scenario;
read a second test code corresponding to a second test check point from the external memory when a second test check point arrives while the test scenario is executed; and
execute the second test code.

3. The storage device of claim 1, wherein the controller is configured to:
invert a value of a bit associated with the first test code from among bits of a bitmap stored in the external memory.

4. The storage device of claim 3, wherein, when the test scenario is completed, the controller is configured to:
read an indexing table, which corresponds to the bitmap, from the external memory;
read a parsing module from the external memory; and
convert the bitmap into data, which includes character strings or an image, by using the indexing table and the parsing module.

5. The storage device of claim 4, wherein the controller is configured to:
write the data in the external memory.

6. The storage device of claim 5, wherein the controller is configured to:
receive information indicating a specific location in the external memory from the external host device; and
write the data at the specific location in the external memory based on the information.

7. The storage device of claim 5, wherein, after writing the data in the external memory, the controller is configured to:
provide the external host device with a signal providing notification that the test scenario is completed.

8. The storage device of claim 7, wherein, after providing the signal to the external host device, the controller is configured to:
receive a command to release the authority to access the external memory from the external host device.

9. The storage device of claim 1, wherein the controller is configured to:
receive information indicating a specific location in the external memory from the external host device; and
read the first test code from the specific location in the external memory based on the information.

10. The storage device of claim 1, wherein the controller is configured to:
request access to the external memory from the external host device.

11. The storage device of claim 1, wherein the controller is configured to:
access the external memory in a peer-to-peer (P2P) manner without intervention of the external host device.

12. A method of testing a storage device, the method comprising:
loading test data into a first area of a host memory;
storing first location information of the test data in a second area of the host memory;
allocating access authority to the storage device for the first area;
transmitting a test scenario, which includes a plurality of commands, to the storage device;

receiving a signal indicating test completion from the storage device; and reading a test result from the first area.

13. The method of claim 12, further comprising:

after receiving the signal indicating the test completion from the storage device, releasing the access authority of the storage device for the first area.

14. The method of claim 12, further comprising:

storing second location information, which indicates a location of the first area where the test result is to be stored, in the second area.

15. The method of claim 14, further comprising:

transmitting the first location information and the second location information to the storage device.

16. The method of claim 12, wherein the test result includes a character string or an image.

17. The method of claim 12, further comprising:

arbitrating access to the first area based on a request from the storage device.

18. A method of testing a storage device, the method comprising:

loading data for testing the storage device to a compute express link (CXL) memory;

storing first location information of the data loaded to the CXL memory in a host memory;

allocating, to the storage device, authority to access the CXL memory;

transmitting a test scenario, which includes a plurality of commands, to the storage device;

receiving, from the storage device, a signal indicating completion of a test; and reading a test result from the CXL memory.

19. The method of claim 18, further comprising:

storing second location information, which indicates a location of the CXL memory where the test result is to be stored, in the host memory.

20. The method of claim 19, further comprising:

transmitting the first location information and the second location information to the storage device.

* * * * *